United States Patent
Sato et al.

(10) Patent No.: US 6,898,056 B2
(45) Date of Patent: May 24, 2005

(54) THIN-FILM MAGNETIC HEAD CAPABLE OF SUPPRESSING SIDE FRINGING

(75) Inventors: Kiyoshi Sato, Niigata-ken (JP); Toshinori Watanabe, Niigata-ken (JP); Naruaki Oki, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 185 days.

(21) Appl. No.: 10/288,152

(22) Filed: Nov. 5, 2002

(65) Prior Publication Data

US 2003/0087132 A1 May 8, 2003

(30) Foreign Application Priority Data

Nov. 7, 2001 (JP) ........................................ 2001-342154

(51) Int. Cl.⁷ ................................................. G11B 5/31
(52) U.S. Cl. ....................................................... 360/126
(58) Field of Search ................................. 360/126, 317

(56) References Cited

U.S. PATENT DOCUMENTS

| | | | |
|---|---|---|---|
| 5,805,391 A | | 9/1998 | Chang et al. |
| 6,104,576 A | * | 8/2000 | Santini ........................ 360/126 |
| 6,111,724 A | * | 8/2000 | Santini ........................ 360/126 |
| 6,130,805 A | | 10/2000 | Sasaki et al. |
| 6,134,080 A | * | 10/2000 | Chang et al. ............... 360/126 |
| 6,156,375 A | * | 12/2000 | Hu et al. ..................... 427/116 |
| 6,163,436 A | | 12/2000 | Sasaki et al. |
| 6,317,288 B1 | | 11/2001 | Sasaki |
| 6,456,461 B1 | * | 9/2002 | Sato ........................... 360/126 |
| 6,459,542 B1 | * | 10/2002 | Sato ........................... 360/126 |
| 6,538,845 B1 | * | 3/2003 | Watanabe et al. .......... 360/126 |
| 6,538,846 B1 | * | 3/2003 | Sato ........................... 360/126 |
| 6,583,954 B1 | * | 6/2003 | Sasaki ........................ 360/126 |
| 6,597,534 B1 | * | 7/2003 | Sato ........................... 360/126 |
| 2001/0008474 A1 | * | 7/2001 | Oki et al. ................... 360/126 |
| 2001/0026419 A1 | * | 10/2001 | Watanabe et al. .......... 360/126 |
| 2002/0030931 A1 | * | 3/2002 | Morita et al. ............... 360/126 |

FOREIGN PATENT DOCUMENTS

JP 2001-118214 4/2001

* cited by examiner

*Primary Examiner*—David L. Ometz
(74) *Attorney, Agent, or Firm*—Brinks Hofer Gilson & Lione

(57) ABSTRACT

By forming a step in a lower core layer, the distance between the upper surface of a Gd-defining layer and the lower core layer is changed stepwise. Consequently, the distance between an upper magnetic pole layer formed on the upper surface of the Gd-defining layer and the lower core layer is small in the front region of the lower core layer, and thus a leakage magnetic field from the upper magnetic pole layer is absorbed by the lower core layer and is not applied to a recording medium.

17 Claims, 23 Drawing Sheets

THIN-FILM MAGNETIC HEAD CAPABLE OF SUPPRESSING SIDE FRINGING

BACKGROUND OF THE INVENTION

1. Field of the Invention

The present invention relates to thin-film magnetic heads, and more particularly, the invention relates to an inductive head which applies a recording magnetic field to a magnetic recording medium.

2. Description of the Related Art

As shown in FIG. 27, a conventional thin-film inductive head includes a lower core layer 82, an upper core layer 83, and a coil layer 88 provided between the lower core layer 82 and the upper core layer 83. The lower core layer 82 has a uniform thickness.

A nonmagnetic gap depth-defining layer (hereinafter referred to as Gd-defining layer) 87 is formed on the lower core layer 82 at a position away from the front end of the lower core layer 82. A lower magnetic pole layer 84 and a gap layer 85 are deposited in that order on the lower core layer 82 in front of the Gd-defining layer 87.

An upper magnetic pole layer 86 includes a front region (pole region) 86a which has a width corresponding to the track width Tw and which is formed on and in contact with the gap layer 85, and a magnetic gap G is formed between the front region 86a of the upper magnetic pole layer 86 and the lower magnetic pole layer 84.

The upper magnetic pole layer 86 also includes a back region 86b which has a width that is larger than the track width Tw and which is formed on and in contact with the Gd-defining layer 87. An upper core layer 83 is connected to the upper surface of the upper magnetic pole layer 86.

In such a thin-film magnetic head, when magnetic information is written into a recording medium, a recording current is applied to the coil layer 88, and a recording magnetic field is induced to the upper corer layer 83 and the lower core layer 82 by the recording current. The recording magnetic field flows from the upper core layer 83 into the upper magnetic pole layer 86, and a leakage magnetic field from the upper magnetic pole layer 86 is applied to the recording medium from the magnetic gap G.

In the conventional thin-film magnetic head, in order to cope with higher recording densities, the upper magnetic pole layer 86 is desirably composed of a magnetic material having high saturation magnetization. However, in the thin-film magnetic head having the conventional structure shown in FIG. 27, if the upper magnetic pole layer 86 is formed so as to have high saturation magnetization, the leakage magnetic field from the upper magnetic pole layer 86 is applied to the recording medium from sections other than the magnetic gap G. This condition is known as "side fringing" in which the width of the recording magnetic field applied to the recording medium exceeds the track width Tw.

SUMMARY OF THE INVENTION

It is an object of the present invention to provide a thin-film magnetic head which can suppress side fringing during writing even if its upper magnetic pole layer has high saturation magnetization.

In one aspect of the present invention, a thin-film magnetic head includes a lower core layer, a nonmagnetic gap layer extending on the front part of the lower core layer, optionally with a lower magnetic pole layer therebetween, an upper magnetic pole layer extending on the gap layer, an upper core layer in contact with the upper surface of the upper magnetic pole layer, the upper core layer extending toward the back, and a coil layer for inducing a recording magnetic field to the lower core layer and the upper core layer. The lower core layer includes a first region with a predetermined thickness extending from the front end toward the back thereof and a second region behind the first region, the upper surface of the second region being lower than the upper surface of the first region. The thin-film magnetic head also includes a nonmagnetic layer extending from a position set back from the front end of the lower core layer over the first region and the second region of the lower core layer. A contact interface between the gap layer and the upper magnetic pole layer extends from the front end to the nonmagnetic layer parallel to the upper surface of the first region, and a gap depth (Gd) is defined within the length of the contact interface. A back region of the upper magnetic pole layer extends on the upper surface of the nonmagnetic layer, and the nonmagnetic layer is located between the back region of the upper magnetic pole layer and the lower core layer. The distance between the second region of the lower core layer and the upper magnetic pole layer is larger than the distance between the first region of the lower core layer and the upper magnetic pole layer.

In such a thin-film magnetic head, at a surface facing a recording medium, it is possible to reduce leakage magnetic flux between the side faces of the upper magnetic pole layer and the lower magnetic pole layer, and thus side fringing can be suppressed. In the back region of the upper magnetic pole layer, the distance between the upper magnetic pole layer and the lower core layer is large. Since the magnetic reluctance between the upper magnetic pole layer and the lower core layer is high in the back region and flux leakage to the upper magnetic pole layer does not become excessive, overwrite characteristics to the recording medium are not degraded.

In the thin-film magnetic head of the present invention, preferably, the gap layer is composed of a nonmagnetic metal for plating.

In such a thin-film magnetic head, at least the gap layer and the upper magnetic pole layer can be continuously formed by plating. Examples of the nonmagnetic metal for plating include NiP.

In the thin-film magnetic head of the present invention, preferably, the lower core layer includes a lower sublayer having a predetermined thickness and an upper sublayer having a predetermined thickness partially disposed on the lower sublayer. A region in which the upper sublayer is disposed on the lower sublayer corresponds to the first region and a region in which the upper sublayer is not disposed on the lower sublayer corresponds to the second region.

In such a thin-film magnetic head, each of the lower sublayer and the upper sublayer of the lower core layer is formed by plating, and the first region and the second region can be formed reliably.

In the thin-film magnetic head of the present invention, preferably, the lower core layer is trimmed from a position set back from the front end so as to have a smaller thickness, and a region having the smaller thickness corresponds to the second region.

In such a thin-film magnetic head, after a magnetic film for forming the lower core layer is formed at a predetermined thickness, the back part thereof is trimmed by etching, and the first region and the second region can be easily formed.

In the thin-film magnetic head of the present invention, preferably, the nonmagnetic layer includes a planarizing nonmagnetic layer, which is formed on the second region of the lower core layer and whose upper surface is flush with the upper surface of the first region, and a gap depth-defining layer (hereinafter referred to as Gd-defining layer) extending over the upper surface of the first region and the planarizing nonmagnetic layer.

In such a thin-film magnetic head, since the Gd-defining layer can be formed on a flat surface, the nonmagnetic layer can be formed with an accurate thickness.

In the thin-film magnetic head of the present invention, more preferably, the gap layer extends on the upper surface of the first region of the lower core layer and the planarizing nonmagnetic layer, and the Gd-defining layer extends from a position set back from the front end on the gap layer.

In such a thin-film magnetic head, after the gap layer is formed, the Gd-defining layer is formed, and then the upper magnetic pole layer is formed. The gap layer may be insulating or conductive as long as it is nonmagnetic.

In the thin-film magnetic head of the present invention, preferably the nonmagnetic layer is a Gd-defining layer extending on the first region and the second region, and the thickness of the Gd-defining layer on the second region is larger than the thickness of the Gd-defining layer on the first region.

In such a thin-film magnetic head, since the Gd-defining layer is directly formed on the lower core layer, the fabrication thereof is facilitated.

In the thin-film magnetic head, more preferably, the gap layer extends from the front end of the lower core layer to the front face of the Gd-defining layer.

In such a thin-film magnetic head, since the gap layer and the upper magnetic pole layer can be formed continuously after the Gd-defining layer is formed, the fabrication thereof is facilitated.

In the thin-film magnetic head, more preferably, the upper surface of the Gd-defining layer is a flat surface parallel to the upper surface of the first region of the lower core layer, above the first region and the second region, and the back region of the upper magnetic pole layer extends on the flat surface.

In such a thin-film magnetic head, the distance between the upper magnetic pole layer and the lower core layer can be determined depending on the shape of the lower core layer. The Gd-defining layer with the flat surface may be composed of either an inorganic material or an organic material.

In the thin-film magnetic head, preferably, the Gd-defining layer is composed of an inorganic insulating material.

The examples of the inorganic insulating material include $SiO_2$ and $Al_2O_3$. Such a Gd-defining layer is formed by sputtering and a desired shape is obtained by photolithography and etching. In such a thin-film magnetic head, the Gd-defining layer can be easily formed with a desired shape.

In the thin-film magnetic head, preferably, the Gd-defining layer is composed of an organic insulating material.

The examples of the organic insulating material include a resist. Such a Gd-defining layer is formed by photolithography. In such a thin-film magnetic head, the Gd-defining layer can be easily formed.

In the thin-film magnetic head of the present invention, the upper magnetic pole layer includes a pole region with a predetermined width and a back region behind the pole region, the width of the back region gradually increasing from the pole region side toward the back, and the base of the pole region is located above the first region of the lower core layer and on the nonmagnetic layer.

In such a thin-film magnetic head, it is possible to suppress side fringing generating at the base of the pole region of the upper magnetic pole layer.

In another aspect of the present invention, a thin-film magnetic head includes a lower core layer, a nonmagnetic gap layer extending on the front part of the lower core layer, optionally with a lower magnetic pole layer therebetween, an upper magnetic pole layer extending on the gap layer, an upper core layer in contact with the upper surface of the upper magnetic pole layer, the upper core layer extending toward the back, and a coil layer for inducing a recording magnetic field to the lower core layer and the upper core layer. A nonmagnetic layer extends from a position set back from the front end over the lower core layer. The contact interface between the gap layer and the upper magnetic pole layer extends from the front end to the nonmagnetic layer parallel to the upper surface of the lower core layer, and a gap depth (Gd) is defined within the length of the contact interface. The nonmagnetic layer includes a front region at the front side of the lower core layer and a back region disposed behind the front region with a step therebetween, the back region having a larger thickness than that of the front region. The upper magnetic pole layer extends on the upper surface of the back region of the nonmagnetic layer. The distance between the lower core layer and the upper magnetic pole layer is small in the front region of the nonmagnetic layer, and the distance between the lower core layer and the upper magnetic pole layer is large in the back region of the nonmagnetic layer.

In such a thin-film magnetic head, at a surface facing a recording medium, it is possible to reduce leakage magnetic flux between the side faces of the upper magnetic pole layer and the lower magnetic pole layer, and thus side fringing can be suppressed. In the back region of the upper magnetic pole layer, the distance between the upper magnetic pole layer and the lower core layer is large. Since the magnetic reluctance between the upper magnetic pole layer and the lower core layer is high in the back region and flux leakage to the upper magnetic pole layer does not become excessive, overwrite characteristics to the recording medium are not degraded.

DESCRIPTION OF THE PREFERRED EMBODIMENTS

Figure 1:
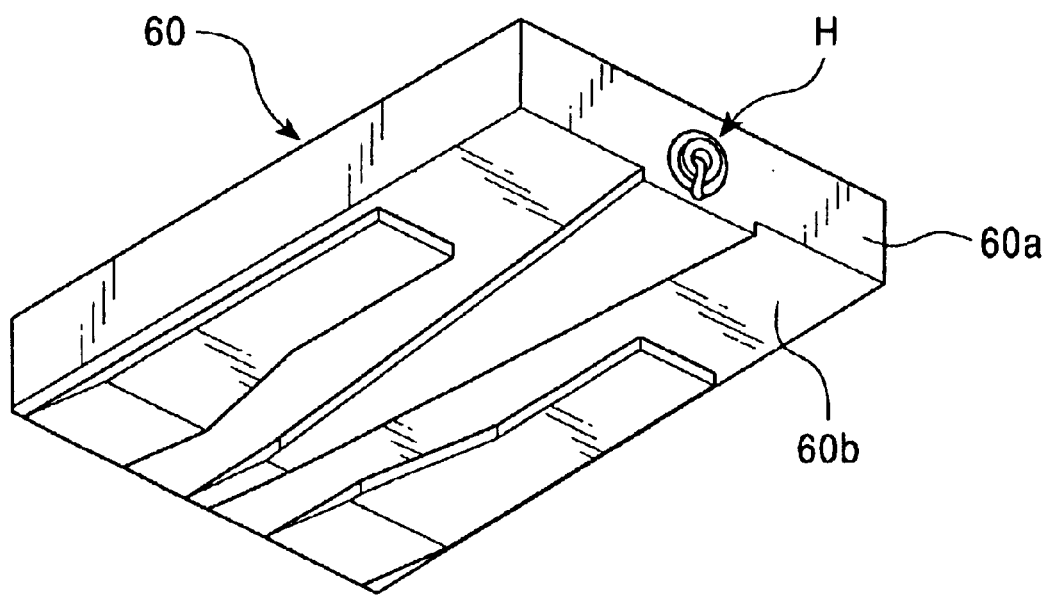
FIG. 1 illustrates a perspective view of a slider provided with a thin-film magnetic head in accordance with the present invention.

FIG. 1 illustrates a perspective view of a slider 60 composed of $Al_2O_3$—TiC, which is a substantial parallelepiped. The slider 60 is mounted on a magnetic recording apparatus, such as a hard magnetic disk unit, and a surface 60b faces a recording medium. A thin-film magnetic head H is provided on a trailing end 60a of the slider 60.

Figure 2:
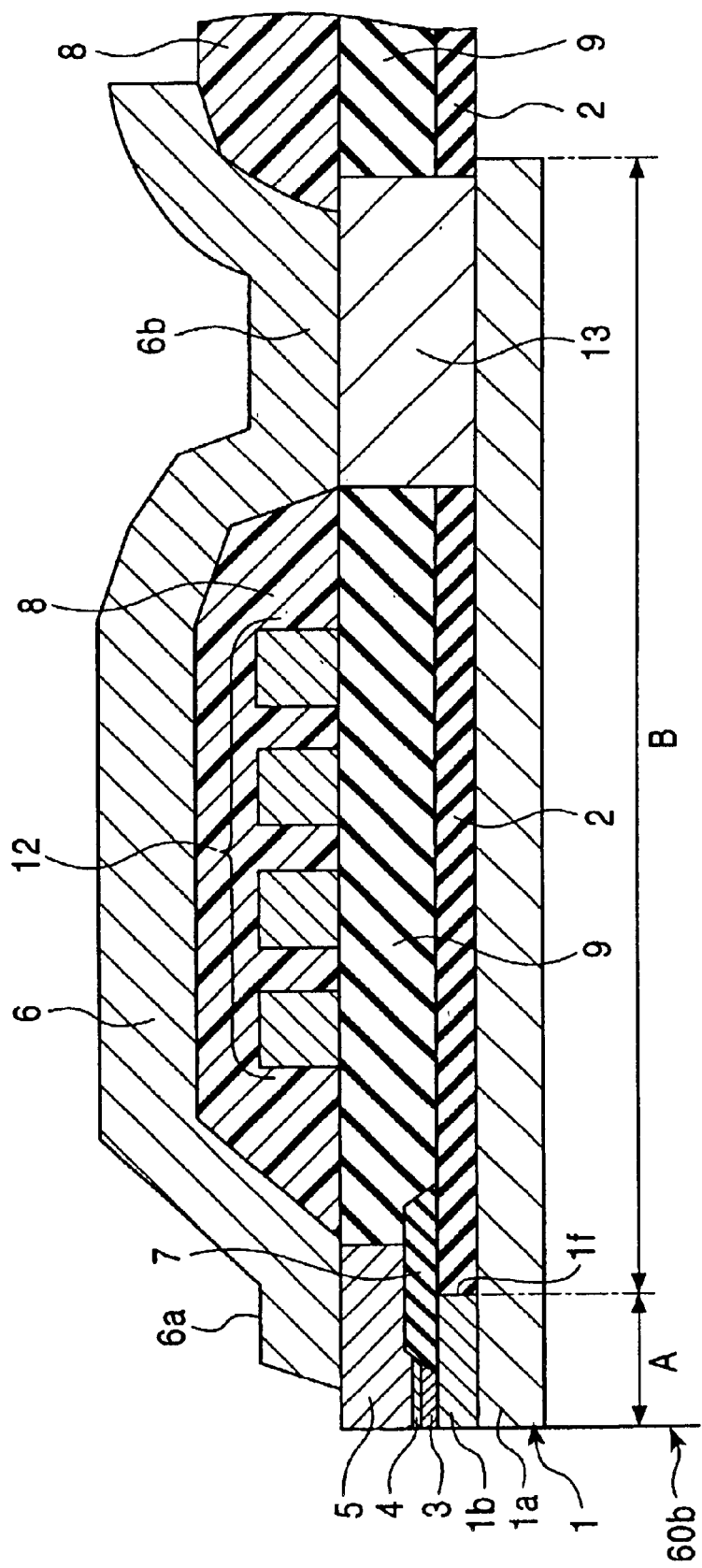
FIG. 2 illustrates a sectional view of a thin-film magnetic head in accordance with a first embodiment of the present invention.
Figure 3:
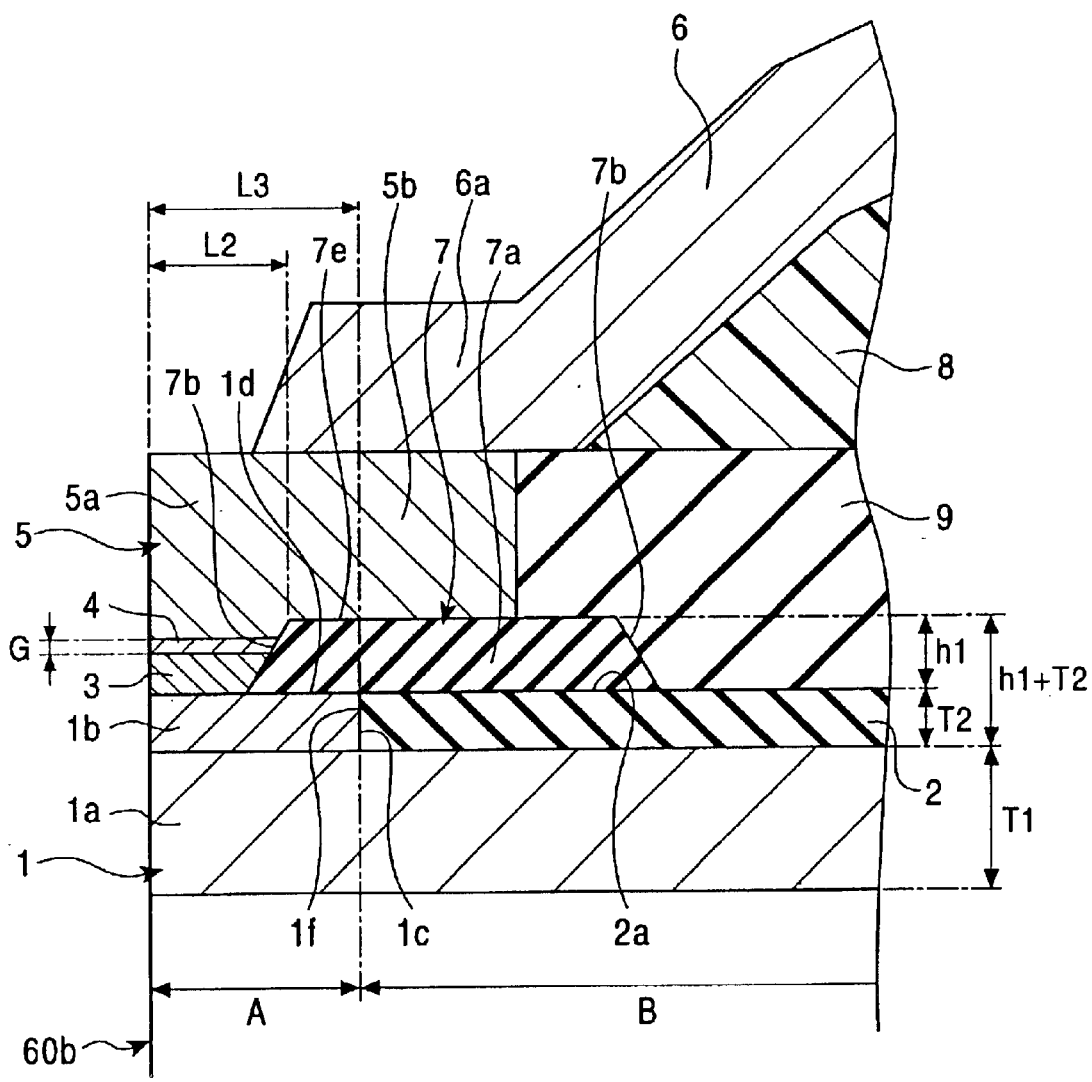
FIG. 3 illustrates a partial sectional view of the thin-film magnetic head in the first embodiment of the present invention.

FIGS. 2 and 3 illustrate a partial sectional view of a thin-film magnetic head in accordance with a first embodiment of the present invention.

A lower core layer 1 composed of Permalloy includes a lower sublayer 1a that has a predetermined thickness (T1). The front end of the lower sublayer 1a is exposed to the surface 60b facing the recording medium.

The lower core layer 1 also includes an upper sublayer 1b which is deposited on the lower sublayer 1a in a first region A. A distance L3 corresponds to a distance from the surface 60b to the rear end face of the upper sublayer 1b.

The front end of the upper sublayer 1b is exposed to the surface 60b. As illustrated in the partial front view of FIG. 4, a magnetic pole-forming region 1g is provided on the top of the upper sublayer 1b. The magnetic pole-forming region 1g has a width corresponding to a track width Tw.

Referring back to FIG. 3, the upper sublayer 1b has a predetermined thickness (T2) and an upper surface 1d thereof is flat.

Figure 4:
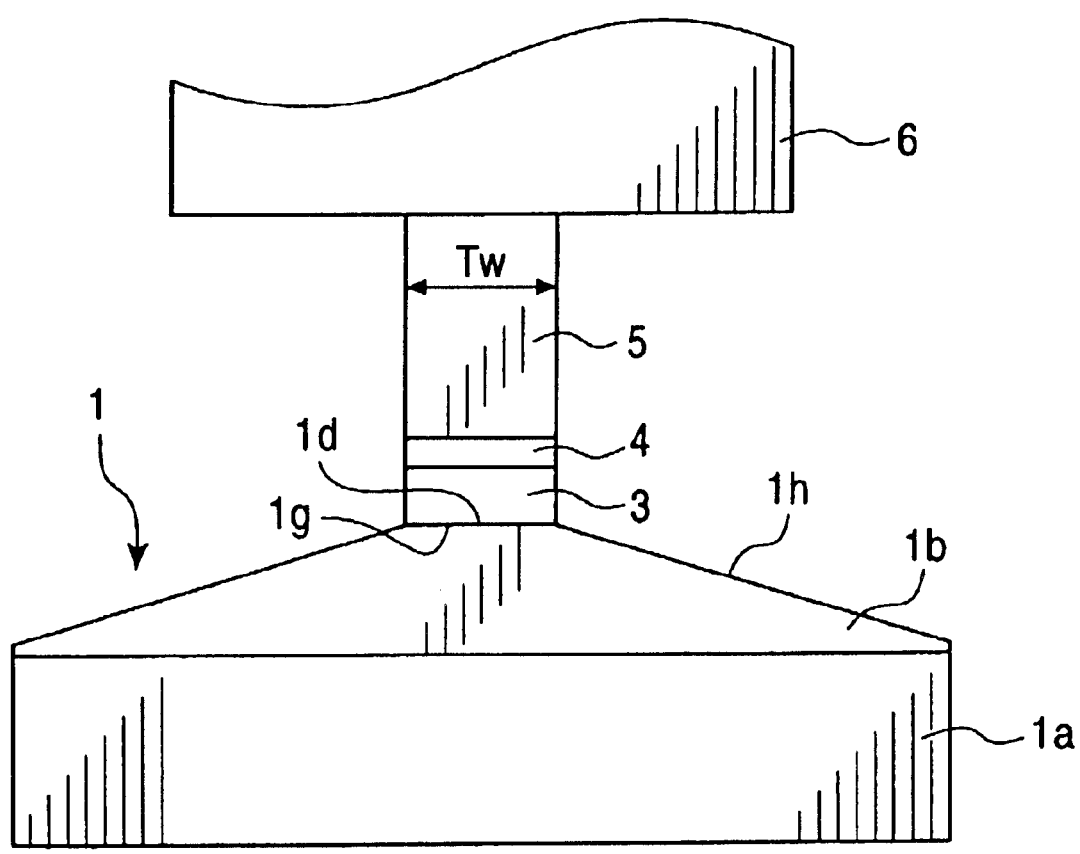
FIG. 4 illustrates a partial front view of the thin-film magnetic head in the first embodiment, viewed from the surface facing a recording medium.

Referring to FIG. 4, inclined regions 1h may be provided on both sides of the magnetic pole-forming region 1g in which the thickness of the upper sublayer 1b gradually decreases from the magnetic pole-forming region 1g. When the inclined regions 1h are provided, the upper surface 1d of the upper sublayer 1b refers to a region extending from the magnetic pole-forming region 1g sandwiched between the inclined regions 1h in a height direction with a predetermined width.

As illustrated in FIG. 3, a rear end face 1c is perpendicular to the upper surface 1d, and the perpendicular rear end face 1c corresponds to a step 1f which forms the boundary between the first region A and the second region B. The second region B of the lower core layer 1 consists of a single layer of the lower sublayer 1a. The distance between the surface 60b and the second region B is larger than the distance L3. Consequently, the first region A of the lower core layer 1 is thick, and the second region B is thinner than the first region A by the height of the step 1f.

A planarizing nonmagnetic layer 2 composed of $Al_2O_3$ or $SiO_2$ is formed on the second region B of the lower core layer 1. The front end face of the nonmagnetic layer 2 is in contact with the rear end face 1c of the upper sublayer 1b of the lower core layer 1, and the thickness (T2) of the nonmagnetic layer 2 is equal to the thickness (T2) of the upper sublayer 1b of the lower core layer 1. An upper surface 2a of the nonmagnetic layer 2 is flush with the upper surface 1d of the upper sublayer 1b.

A Gd-defining layer 7 is formed on the upper surface 1d of the upper sublayer 1b of the lower core layer 1 and on the upper surface 2a of the nonmagnetic layer 2. The Gd-defining layer 7 extends from a position set back from the surface 60b and on the upper sublayer 1b of the lower core layer 1 toward the back, and the rear end of the Gd-defining layer 7 lies on the nonmagnetic layer 2.

The Gd-defining layer 7 is composed of a nonmagnetic inorganic insulating material, such as $SiO_2$ or $Al_2O_3$, and the Gd-defining layer 7 is provided with a pair of inclined regions 7b. In each inclined region 7b, the thickness gradually increases from the end face toward the center of the Gd-defining layer 7. A planar region 7a of the Gd-defining layer 7 sandwiched between the pair of inclined regions 7b has a predetermined thickness (h1). The upper surface of the planar region 7a is parallel to the upper surface of the upper sublayer 1b of the lower core layer 1. The planar region 7a of the Gd-defining layer 7 extends from the upper surface of the first region A of the lower core layer 1 to the upper surface of the planarizing nonmagnetic layer 2 via the step 1f. Additionally, the Gd-defining layer 7 may be composed of a nonmagnetic organic insulating material, such as a resist.

A lower magnetic pole layer 3 composed of a magnetic material has a width corresponding to the track width Tw, and is formed on the magnetic pole-forming region 1g of the lower core layer 1 at the surface 60b side of the Gd-defining layer 7. The front end of the lower magnetic pole layer 3 is exposed to the surface 60b, and the rear end of the lower magnetic pole layer 3 is in contact with the inclined region 7b of the Gd-defining layer 7.

A gap layer 4 composed of a nonmagnetic metallic material, such as NiP, has a width corresponding to the track width Tw, and is formed on the lower magnetic pole layer 3 at the surface 60b side of the Gd-defining layer 7. The rear end of the gap layer 4 is in contact with the inclined region 7b of the Gd-defining layer 7, and the front end of the gap layer 4 is exposed to the surface 60b.

An upper magnetic pole layer 5 has a single-layered structure composed of a material having a higher saturation magnetization than that of Permalloy, or has a multi-layered structure in which a material having a higher saturation magnetization than that of Permalloy, and Permalloy are deposited in sequence on the gap layer 4.

Figure 5:
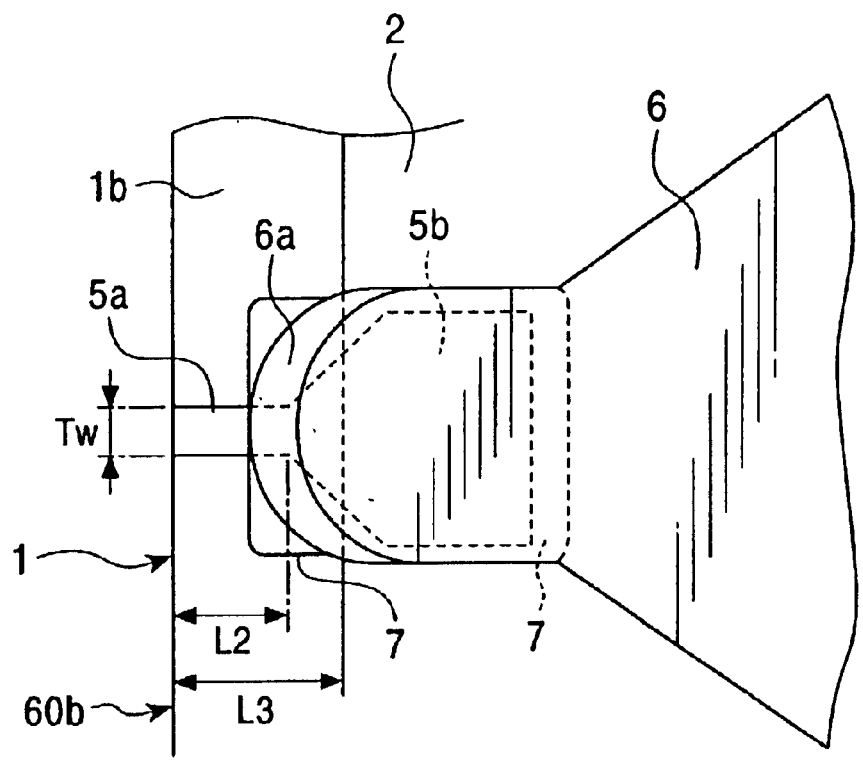
FIG. 5 illustrates a plan view of the thin-film magnetic head of the first embodiment.

As illustrated in FIG. 5, the upper magnetic pole layer 5 includes a front region (pole region) 5a having a width corresponding to the track width Tw and a back region 5b in which the width gradually increases from the base of the front region 5a and the width is larger than the track width Tw.

The front region (pole region) 5a of the upper magnetic pole layer 5 is placed on the gap layer 4 and is exposed to the surface 60b. The base of the front region 5a of the upper magnetic pole layer 5 is away from the surface 60b by a distance L2, and is located substantially on the boundary between the inclined region 7b and the planar region 7a of the Gd-defining layer 7.

Additionally, the base of the front region 5a of the upper magnetic pole layer 5 may be on the inclined region 7b of the Gd-defining layer 7 or on the planar region 7a of the Gd-defining layer 7.

As illustrated in FIG. 3, a magnetic gap G is formed at the gap layer 4 between the front region 5a of the upper magnetic pole layer 5 and the lower magnetic pole layer 3. A gap depth is defined within the length of the contact interface between the gap layer 4 and the upper magnetic pole layer 5, the contact interface extending parallel to the upper surface of the lower core layer 1 in the first region A.

As illustrated in FIG. 5, the back region 5b of the upper magnetic pole layer 5 extends over the planar region 7a of the Gd-defining layer 7, and the upper magnetic pole layer 5 is formed so as to be directly in contact with the upper surface 7e of the planar region 7a of the Gd-defining layer 7. The back region 5b of the upper magnetic pole layer 5 passes over the step 1f of the lower core layer 1 and extends to a region above the planarizing nonmagnetic layer 2.

Referring back to FIG. 3, the distance between the back region 5b of the upper magnetic pole layer 5 and the lower core layer 1 corresponds to the thickness h1 of the Gd-defining layer 7 in the first region A, which is the surface 60b side of the step 1f. The distance between the back region 5b of the upper magnetic pole layer 5 and the lower core layer 1 corresponds to the sum of the thickness (h1) of the Gd-defining layer 7 and the thickness (T2) of the nonmagnetic layer 2 in the second region B.

As described above, the distance between the back region 5b of the upper magnetic pole layer 5 and the lower core layer 1 is small in the first region A in front of the step 1f of the lower core layer 1, and is large in the second region B in the back of the step 1f.

Referring back to FIG. 2, an elevating layer 13 composed of a magnetic metallic material is formed by plating inside the thin-film magnetic head H, and the elevating layer 13 is magnetically coupled to the lower core layer 1.

An insulating layer 9 which covers the planarizing nonmagnetic layer 2 and the Gd-defining layer 7 is formed in a region other than the lower magnetic pole layer 3, the gap layer 4, the upper magnetic pole layer 5, and the elevating layer 13. The upper surface of the insulating layer 9 is flush with the upper surface of the upper magnetic pole layer 5. A coil layer 12 is provided on the insulating layer 9, and the coil layer 12 is formed by plating so as to wind around the elevating layer 13. The coil layer 12 is embedded within a coil insulating layer 8, and the upper surface of the coil layer 12 is covered with the coil insulating layer 8.

An upper core layer 6 is formed by plating so as to cover the coil insulating layer 8 with a base 6b of the upper core layer 6 being connected to the elevating layer 13, and a tip 6a is connected to the upper surface of the upper magnetic pole layer 5. The tip 6a of the upper core layer 6 extends from a position set back from the surface 60b in the height direction without being exposed to the surface 60b. The tip 6a inclines toward the back.

Although not shown in the drawing, a second coil layer connected to the coil layer 12 may be formed in the insulating layer 9 so that the coil layer has the two-layered structure.

Next, a method for fabricating a thin-film magnetic head of the first embodiment of the present invention will be described with reference to FIGS. 6 to 9.

Figure 6:
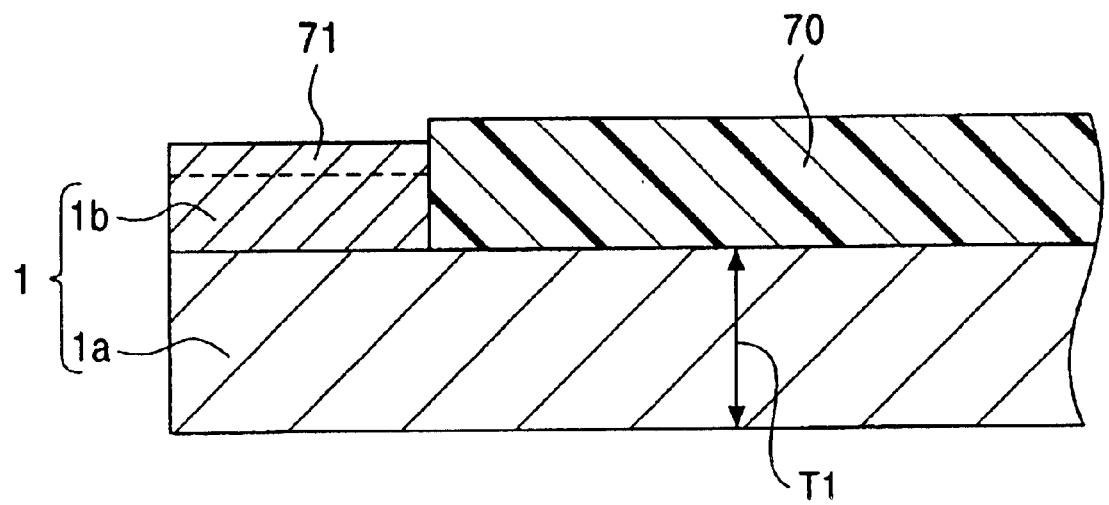
FIG. 6 illustrates a sectional view showing a step in a method for fabricating a thin-film magnetic head of the first embodiment.

First, as illustrated in FIG. 6, a lower sublayer 1a of a lower core layer 1 is formed by plating so as to have a predetermined thickness (T1), and then a resist layer 70 is formed on the lower sublayer 1a so as to surround a region to be acting as an upper sublayer 1b of the lower core layer 1. After a magnetic film 71 is formed by plating in the region surrounded by the resist layer 70, the resist layer 70 is stripped off. Magnetic film 71 will form the upper sublayer 1b of the lower core layer 1.

Figure 7:
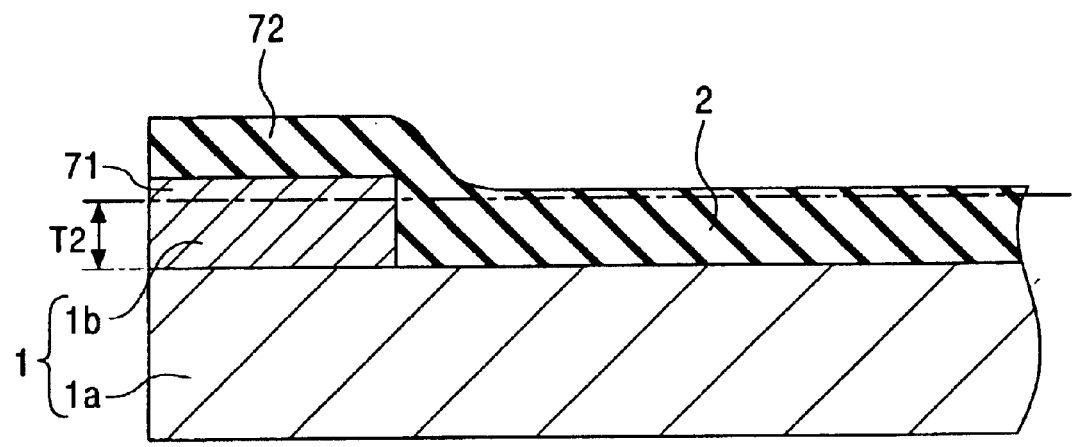
FIG. 7 illustrates a sectional view showing a process step for fabricating the thin-film magnetic head of the first embodiment.

As illustrated in FIG. 7, a nonmagnetic film 72 composed of, for example, $Al_2O_3$ or $SiO_2$ is formed by sputtering on the lower sublayer 1a of the lower core layer 1 and on the magnetic film 71. Nonmagnetic film 72 will form the planarizing nonmagnetic layer 2. By polishing away the nonmagnetic film 72 by chemical mechanical polishing (CMP), the magnetic film 71 is exposed. Polishing is performed until the surface of the magnetic film 71 and the surface of the nonmagnetic film 72 are flush with each other and the magnetic film 71 and the nonmagnetic film 72 have a predetermined thickness (T2). The lower core layer 1 and the nonmagnetic layer 2 are thereby completed.

Figure 8:
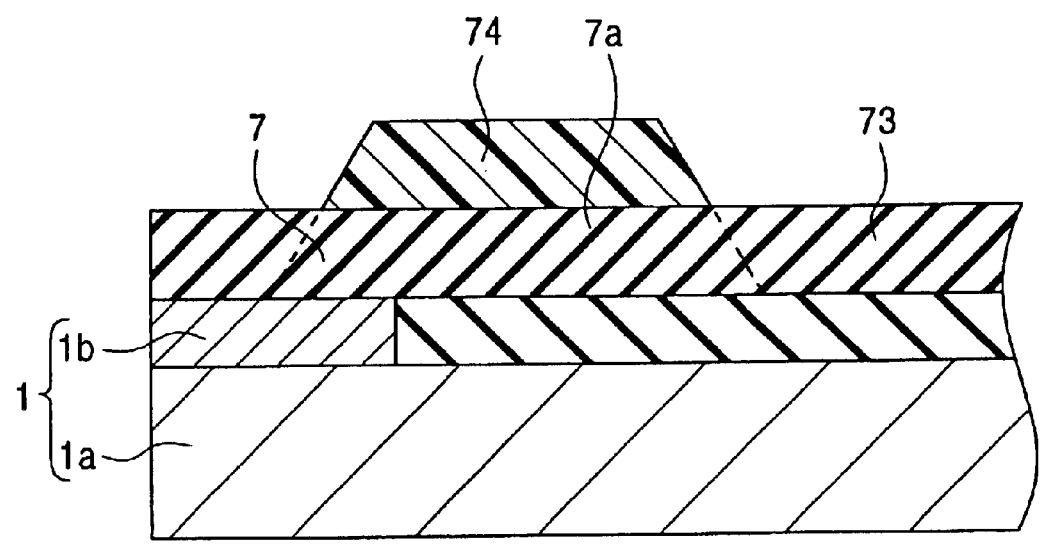
FIG. 8 illustrates a sectional view showing another process step for fabricating the thin-film magnetic head of the first embodiment.

As illustrated in FIG. 8, an inorganic insulating film 73 for forming a Gd-defining layer 7 is formed by sputtering on the lower core layer 1 and the nonmagnetic layer 2. A region acting as a planar region 7a of the Gd-defining layer 7 in the inorganic insulating film 73 is covered with a resist mask 74.

Inclined regions are formed in the resist mask 74 in which the thickness increases from the edges depending on the baking conditions.

Next, using the resist mask 74, the inorganic insulating film 73 is etched. The portion of the inorganic insulating film 73 covered with the resist mask 74 remains, and the Gd-defining layer 7 is thereby formed. In the Gd-defining layer 7, inclined regions 7b are formed continuously from the inclined regions of the resist mask 74.

If a Gd-defining layer 7 is composed of a resist, a resist film formed at a position of the Gd-defining layer 7 may be cured by ultraviolet light so as to form the planar region 7a and the inclined regions 7b.

Figure 9:
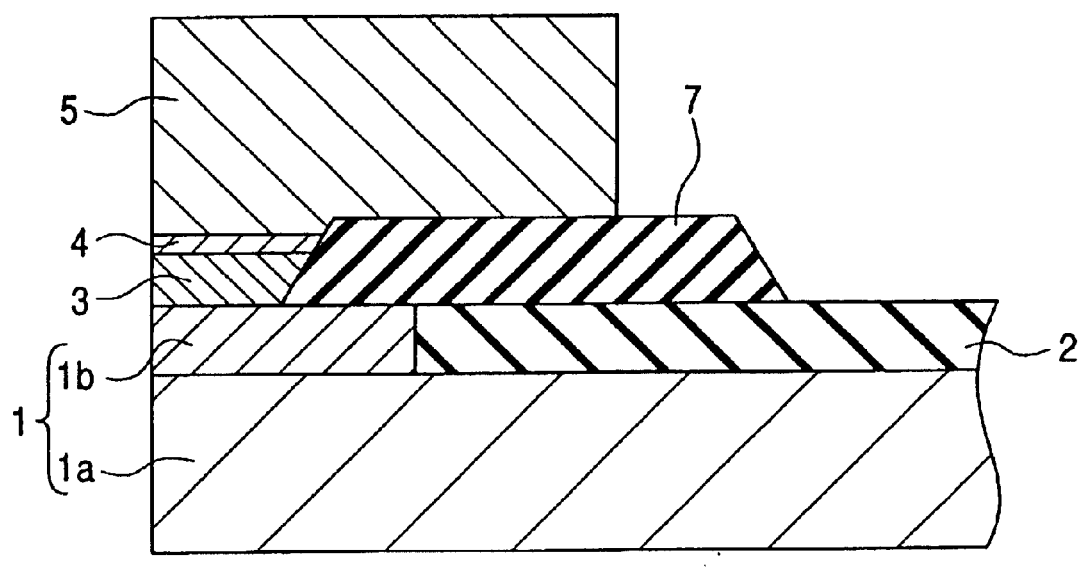
FIG. 9 illustrates a partial sectional view showing a process step for fabricating the thin-film magnetic head of the first embodiment.

After the resist mask 74 is stripped off, as shown in FIG. 9, a lower magnetic pole layer 3, a gap layer 4, and an upper magnetic pole layer 5 are continuously formed by frame plating.

Next, an insulating layer 9, an elevating layer 13, a coil layer 12, a coil insulating layer 8, and an upper core layer 6 as shown in FIG. 2 are formed in sequence, and the fabrication of the thin-film magnetic head is thereby completed.

Next, writing of information using a magnetic recording apparatus provided with such a thin-film magnetic head H will be described.

A recording medium (not shown in the drawing), such as a hard disk, of the recording apparatus rotates while a surface 60b of a slider 60 provided with the thin-film magnetic head H faces the recording medium. At this stage, the slider 60 slightly floats above the surface of the recording medium due to an airflow occurring on the surface of the recording medium. The floating posture of the slider 60 is determined so that the distance between the thin-film magnetic head H provided on the end of the slider 60 and the surface of the recording medium is within a predetermined value.

When a recording current is applied to the coil layer 12 of the thin-film magnetic head H, a recording magnetic field is induced in the upper core layer 6 and the lower core layer 1. The recording magnetic field generates a leakage magnetic field between the upper magnetic pole layer 5 and the lower magnetic pole layer 3 with the gap layer 4 therebetween, and the leakage magnetic field is applied to the recording medium.

In a thin-film magnetic head for high-density writing in which the track width Tw is extremely narrow, in order to improve writing and reading characteristics (overwrite characteristics), the upper magnetic pole layer 5 is preferably composed of a magnetic material having a higher saturation magnetization than that of the upper core layer 6, and the lower magnetic pole layer 3 is also preferably composed of a magnetic material having a higher saturation magnetization than that of the lower core layer 1.

However, if the upper magnetic pole layer 5 and the lower magnetic pole layer 3 are composed of magnetic materials having high saturation magnetization, in the case of a narrow track width, the leakage magnetic field between the side faces of the upper magnetic pole layer 5 and the lower core layer 1 tends to increase, resulting in side fringing. Therefore, in the embodiment illustrated in FIG. 3, at the back of the gap depth, the distance between the upper magnetic pole layer 5 and the lower core layer 1 is set so as to correspond to the thickness h1 of the Gd-defining layer 7 in the first region A, and the distance between the upper magnetic pole layer 5 and the lower core layer 1 is set so as to correspond to the thickness of the Gd-defining layer 7 and the thickness of the planarizing nonmagnetic layer 2 in the second region B at the back of the first region A (the sum h1+T2) That is, the distance between the upper magnetic pole layer 5 and the lower core layer 1 is small in the first region A and large in the second region B.

Consequently, in the first region A, by decreasing the thickness h1 of the Gd-defining layer 7, at the back of the gap depth region, the leakage magnetic field from the upper magnetic pole layer 5 or the lower core layer 1 passes through the Gd-defining layer 7 and is easily absorbed by the lower core layer 1 or the upper magnetic pole layer 5. As a result, at the surface facing the recording medium, the leakage magnetic flux between the side faces of the upper magnetic pole layer 5 and the lower magnetic pole layer 3 can be decreased. By reducing the leakage magnetic flux, side fringing, in which the width of the leakage magnetic field applied to the recording medium between the upper magnetic pole layer 5 and the lower magnetic pole layer 3 extends extremely sideward from the track width, can be suppressed.

However, since the back region of the upper magnetic pole layer 5 lies in the second region B, in the back region of the upper magnetic pole layer 5, the distance between the upper magnetic pole layer 5 and the lower core layer 1 is increased. In this region, magnetic reluctance between the upper magnetic pole layer 5 and the lower core layer 1 is considerably increased. Therefore, at the back of the gap depth region, the magnetic reluctance between the upper magnetic pole layer 5 and the lower core layer 1 can be the same as in a conventional thin-film magnetic head.

In the region at the back of the gap depth region, the overall magnetic reluctance between the upper magnetic pole layer 5 and the lower core layer 1 is maintained high, while in the region close to the surface facing the recording medium, at the back of the gap depth region, the flux saturated or the flux close to saturation in the upper magnetic pole layer 5 is easily passed to the lower core layer 1. Therefore, it is possible to prevent the leakage magnetic field used for writing from being wider than the track width Tw. Moreover, further in the back region, the magnetic reluctance between the upper magnetic pole layer 5 and the lower core layer 1 is increased so that the flux leakage applied to the upper magnetic pole layer 5 does not become excessive. Therefore, the overwrite characteristics to the recording medium are not degraded.

In order for the magnetic flux to easily pass through the space between the upper magnetic pole layer 5 and the lower core layer 1, the thickness h1 of the Gd-defining layer 7 is preferably in the range of 0.3 to 1.2 $\mu$m at the back of the gap depth region and in the first region A. In the second region B, in order to prevent the flux leakage from becoming excessive, preferably, the distance (h1+T2) between the lower core layer 1 and the upper magnetic pole layer 5 is in the range of 0.8 to 2.5 $\mu$m.

A second embodiment of the present invention will now be described with reference to FIGS. 10, 14, and 15.

A lower core layer 11 composed of Permalloy is formed by plating and the front end thereof is exposed to a surface 60b facing a recording medium.

Figure 14:
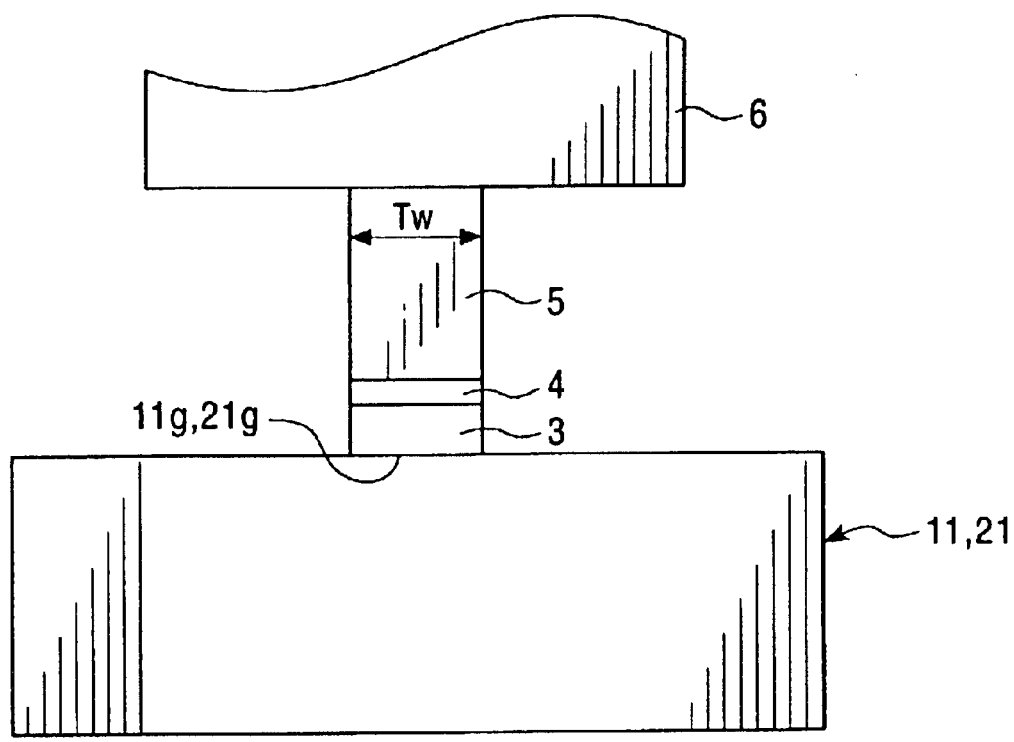
FIG. 14 illustrates a partial front view of the thin-film magnetic head of the second embodiment, viewed from the surface facing a recording medium.
Figure 15:
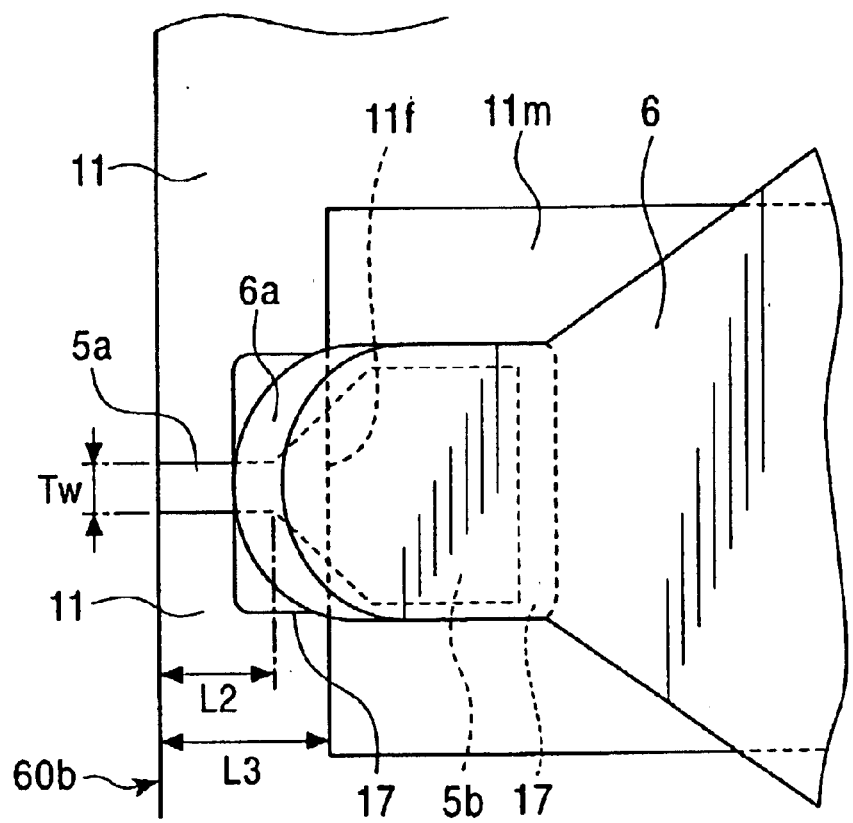
FIG. 15 illustrates a plan view of the thin-film magnetic head of the second embodiment.

As shown in FIG. 14, in the same manner as that in the first embodiment, at the surface facing the recording medium, a magnetic pole-forming region 11g is provided in the center of the lower core layer 11. As shown in FIG. 10, the lower core layer 11 has a predetermined thickness (T3) in the first region A. Additionally, inclined regions may be provided on both sides of the magnetic pole-forming region 11g in which the thickness of gradually decreases from the magnetic pole-forming region 11g.

A recess 11m is formed in upper surface 11e of the lower core layer 11 in the second region B extending from a position displaced away from the surface 60b by the distance L3. The recess 11m has a predetermined width from the boundary between the first region A and the second region B to the rear end of the lower core layer 11.

The thickness of the lower core layer 11 in the recess 11m is smaller than the predetermined thickness (T3) in the first region A. In the boundary between the first region A and the second region B, at the edge of the recess 11m, a step 11f is formed in which the thickness of the lower core layer 11 gradually decreases from the predetermined thickness (T3). At the back of the step 11f, a planar region 11d is formed in which the lower core layer 11 has a predetermined thickness (T4).

A Gd-defining layer 17 which is composed of a nonmagnetic inorganic insulating material, such as $Al_2O_3$ or $SiO_2$, or a nonmagnetic organic insulating material, such as a resist, is formed so as to be in contact with the upper surface 11e of the lower core layer 11. The front end of the Gd-defining layer 17 is placed at a position set back from the surface 60b by a predetermined distance, and the front end is positioned on upper surface 11e within the first region A. The rear end of the Gd-defining layer 17 is positioned on the second region B of the lower core layer 11.

The Gd-defining layer 17 includes an inclined region 17b placed on the first region A of the lower core layer 11. In the inclined region 17b, the thickness gradually increases from the front toward the back. A region of Gd-defining layer 17 at the back of the inclined region 17b on the first region A has a uniform thickness (h3).

The Gd-defining layer 17 includes an inclined region 17d positioned on the recess 11m in which the thickness gradually increases from the back toward the front. A region of the Gd-defining layer 17 in front of the inclined region 17d and on the second region B has a uniform thickness (h2).

As described above, the thickness of the Gd-defining layer 17 is small in the first region A and is large in the second region B. The Gd-defining layer 17 includes a planar region 17c located between the inclined region 17b and the inclined region 17d. The upper surface 17e of the Gd-defining layer 17 in the planer region 17c is parallel to the upper surface 11e of the lower core layer 11 in the first region A.

Since a lower magnetic pole layer 3, a gap layer 4, an upper magnetic pole layer 5, and an upper core layer 6 are the same as those in the first embodiment, the same reference numerals are used, and the description thereof is omitted. As shown in FIG. 15, the back region 5b of the upper magnetic pole layer 5 is formed on the Gd-defining layer 17. The width of the upper magnetic pole layer 5 is smaller than the width of the recess 11m of the lower core layer 11.

Figure 10:
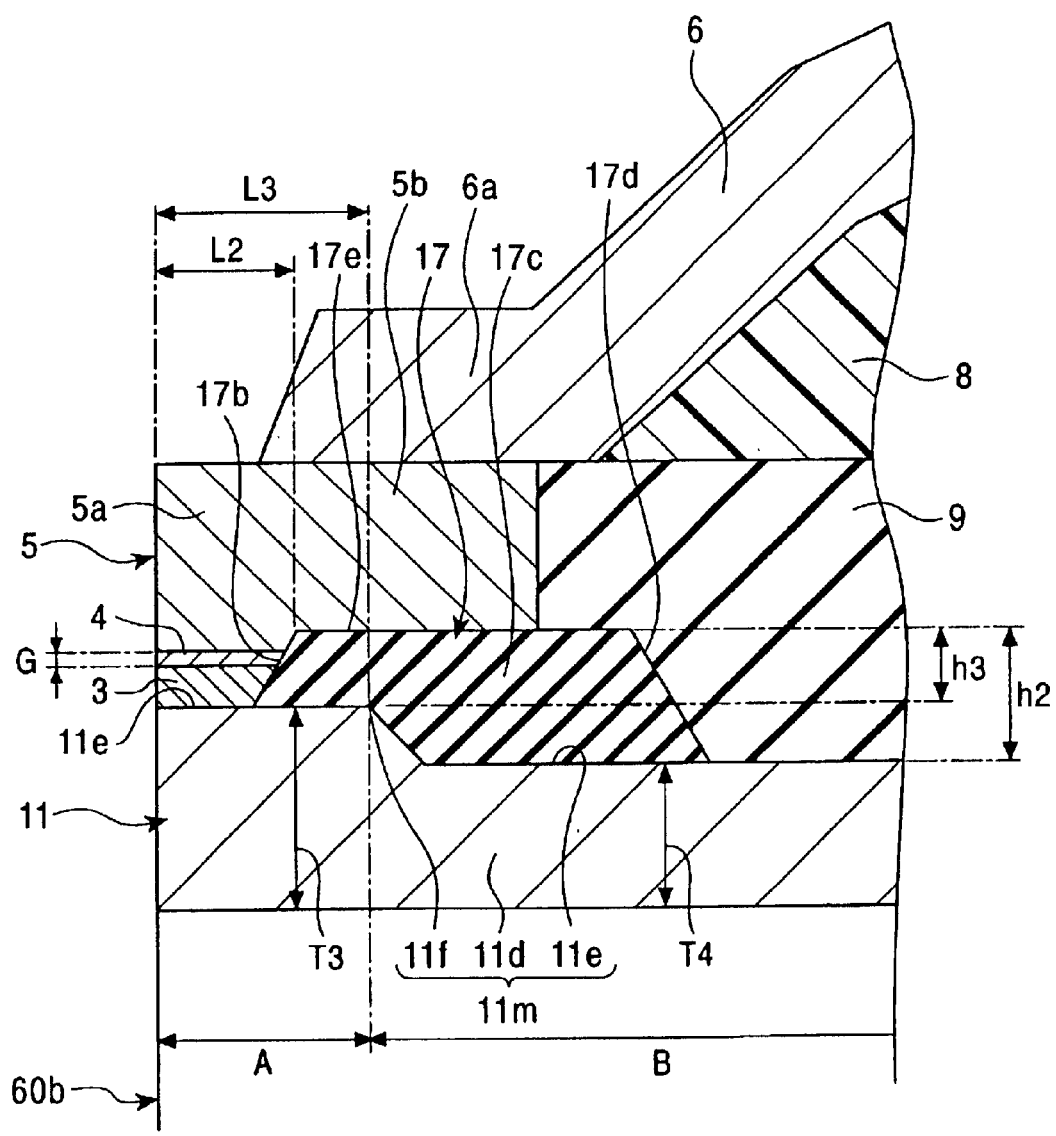
FIG. 10 illustrates a partial sectional view of a thin-film magnetic head in accordance with a second embodiment of the present invention.

As shown in FIG. 10, in the second embodiment, in the first region A at the back of the gap depth region, the distance between the upper magnetic pole layer 5 and the lower core layer 11 is equivalent to the thickness (h3) of the Gd-defining layer 17. In the second region B, the distance between the upper magnetic pole layer 5 and the lower core layer 11 is equivalent to the larger thickness (h2) of the Gd-defining layer 17 formed in the recess 11m.

Additionally, the recess 11m of the lower core layer 11 may be filled with a nonmagnetic material so that the Gd-defining layer 17 has a uniform thickness between the inclined regions 17b and 17d in the same manner as that in the first embodiment.

In similarity with the first embodiment illustrated in FIG. 2, the magnetic head of the second embodiment can also include an elevating layer 13, an insulating layer 9, a coil layer 12, a coil insulating layer 8, and an upper core layer 6.

Figure 11:
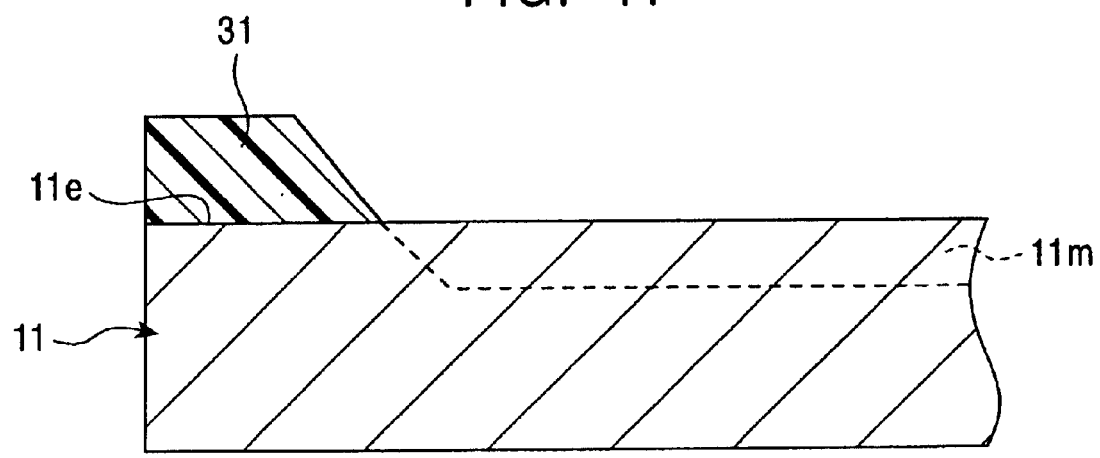
FIG. 11 illustrates a sectional view showing a process step for fabricating a thin-film magnetic head of the second embodiment.
Figure 12:
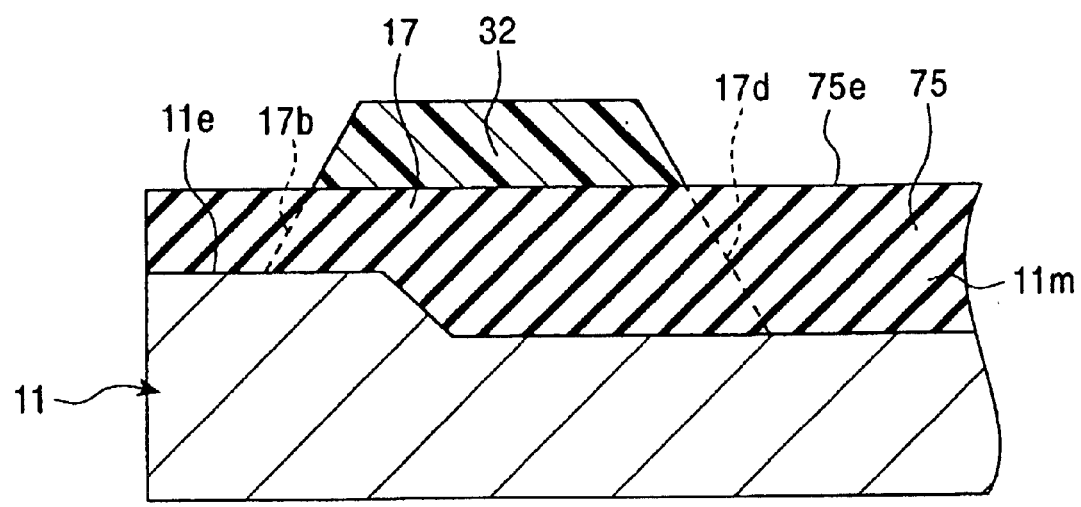
FIG. 12 illustrates a partial sectional view showing a process step for fabricating the thin-film magnetic head of the second embodiment.

Next, a method for fabricating a thin-film magnetic head in the second embodiment of the present invention will be described with reference to FIGS. 11 and 12. First, a lower core layer 11 is formed with a predetermined thickness, and then a region acting as the first region A of the lower core layer 11 is covered with a resist film 31. In the resist film 31, the edge thereof is inclined depending on the heating conditions. The resist film 31 is solidified by heating after a pattern is formed by photolithography.

A recess 11m is formed by ion milling in the exposed portions of upper surface 11e that are not covered with the resist film 31. The edge of the recess 11m is inclined by the influence of the inclination of the resist film 31.

Next, an inorganic nonmagnetic film 75 for forming a Gd-defining layer 17 is deposited on the lower core layer 11. The inorganic nonmagnetic film 75 is formed so as to fill the recess 11m and to have a flat upper surface 75e.

A resist film 32 is formed on the inorganic nonmagnetic film 75 at a section acting as the upper surface of the Gd-defining layer 17. In the resist film 32, the edges thereof are inclined depending on the heating conditions. The resist film 32 is solidified by heating after a pattern is formed by photolithography.

By etching the inorganic nonmagnetic film 75, the Gd-defining layer 17 is formed. Inclined regions 17b and 17d are formed in the Gd-defining layer 17 by reproducing the inclination of the resist film 32. Additionally, if a Gd-defining layer 17 is composed of a resist, a resist film formed on the lower core layer 11 at a position of the Gd-defining layer 17 may be cured by ultraviolet light.

In the same manner as that in the first embodiment, after a lower magnetic pole layer 3, a gap layer 4, and an upper magnetic pole layer 5 are formed, an elevating layer 13, an insulating layer 9, a coil layer 12, a coil insulating layer 8, and an upper core layer 6 are formed. In the method in which the step 11f is formed by etching the lower core layer 11, the number of fabrication steps is smaller compared to the method in which the lower sublayer 1a and the upper sublayer 1b are deposited as in the lower core layer 1 in the first embodiment, thus facilitating the fabrication of the thin-film magnetic head.

In the thin-film magnetic head H of the second embodiment, in the same manner as that in the first embodiment, by decreasing the thickness (h3) of the Gd-defining layer 17 located between the upper magnetic pole layer 5 and the lower core layer 11 at the back of the gap depth region, the distance between the upper magnetic pole layer 5 and the lower core layer 11 is decreased. Accordingly, the saturated flux or the flux close to saturation in the upper magnetic pole layer 5 is easily passed to the lower core layer 11 at the back of the back depth region. Therefore, it is possible to prevent generated flux, applied to the recording medium, from being extremely wider than the track width Tw on both sides of the leakage magnetic field.

In the second region B at the back of the step 11f of the lower core layer 11, since the distance between the upper magnetic pole layer 5 and the lower core layer 11 is gradually increased toward the back, the amount of the flux being passed through the space between the upper magnetic pole layer 5 and the lower core layer 1 gradually decreases toward the back.

In the second region B, by increasing the depth of the recess 11m of the lower core layer 11 and increasing the distance between the upper magnetic pole layer 5 and the lower core layer 11, the magnetic reluctance between the upper magnetic pole layer 5 and the lower core layer 11 can be increased. Therefore, at the back of the gap depth region, the overall magnetic reluctance between the upper magnetic pole layer 5 and the lower core layer 11 can be maintained high, and overwrite characteristics are not degraded. That is, when the upper magnetic pole layer 5 is composed of a magnetic material with high saturation magnetization, the characteristics thereof can be displayed and overwrite characteristics can be improved when information is written into a medium with a narrow track width.

Figure 13:
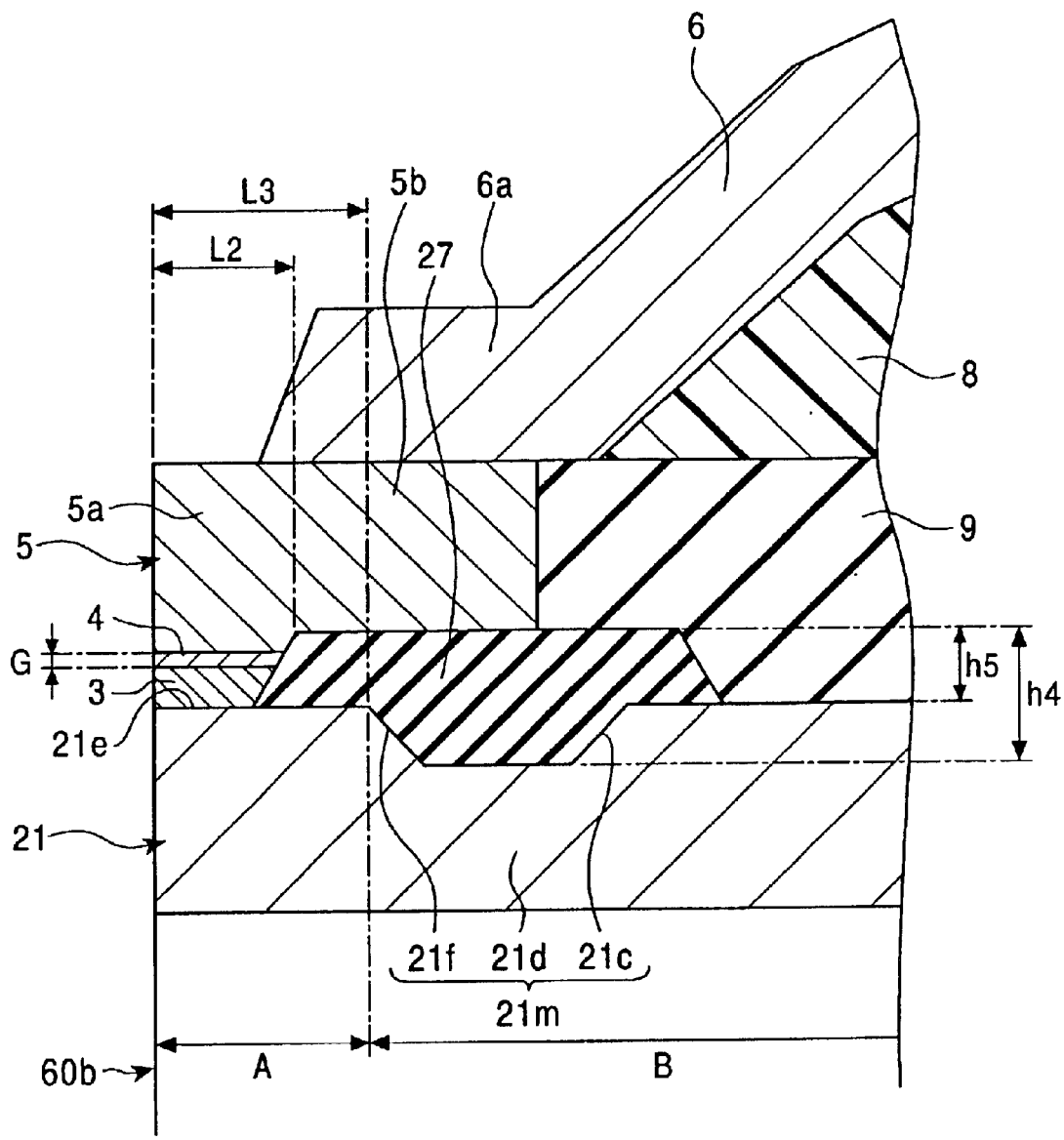
FIG. 13 illustrates a partial sectional view of a thin-film magnetic head of a third embodiment of the present invention.

FIG. 13 is a sectional view illustrating a portion of a thin-film magnetic head of a third embodiment of the present invention. In similarity to the second embodiment, a lower core layer 21 includes a recess 21m, a recessed upper surface 21e. However, the recess 21m does not extend to the rear end of the lower core layer 21.

In the lower core layer 21, in a manner similar to the second embodiment, an inclined first step 21f is formed in the boundary between the first region A and the second region B, and a planar region 21d is formed inside the recess 21m. In the lower core layer 21, an inclined second step 21c opposing the first step 21f is also formed in the second region B.

The thickness (h4) of a Gd-defining layer 27 formed in the recess 21m is larger than the thickness (h5) of the Gd-defining layer 27 formed outside the recess 21m in a manner similar to the second embodiment. The front end and the rear end of the Gd-defining layer 27 have the same thickness (h5) because both ends are formed outside the recess 21m.

Since a lower magnetic pole layer 3, a gap layer 4, an upper magnetic pole layer 5, an insulating layer 9, a coil layer 12, a coil insulating layer 8, and an upper core layer 6 are similar to those in the first embodiment, the same reference numerals are used, and the description thereof is omitted.

Since the fabrication method in the third embodiment is similar to the second embodiment, the description thereof is omitted.

In the third embodiment, the thin-film magnetic head H performs writing in a similar manner as the second embodiment. The leakage magnetic field from the upper magnetic pole layer 5 is also easily absorbed by the lower core layer 21 in the back side of the lower core layer 21, and side fringing can be suppressed.

Next, a fourth embodiment of the present invention will be described with reference to FIGS. 16 to 18.

A lower core layer 31 includes a lower sublayer 31a, an upper sublayer 31b deposited on the lower sublayer 31a in the first region A, and a step 31f corresponding to the perpendicular rear end face of the upper sublayer 31b placed at the boundary between the first region A and the second region B.

Figure 18:
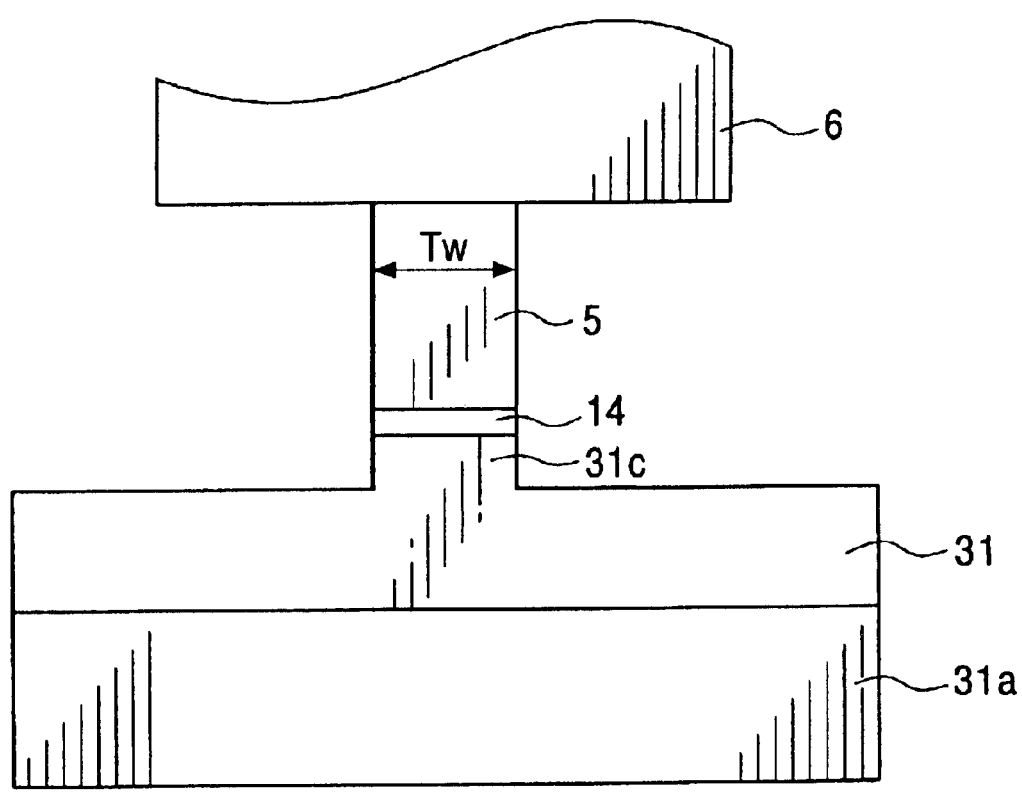
FIG. 18 illustrates a partial front view of the thin-film magnetic head of the third embodiment, viewed from the surface facing a recording medium.

As shown in FIG. 18, at the front end of the upper sublayer 31b, a magnetic pole region 31c with a width corresponding to the track width Tw is provided so as to protrude in the thickness direction of the upper sublayer 31b. That is, in the fourth embodiment, the magnetic pole region 31c, which corresponds to the lower magnetic pole layer 3 in the first embodiment, is integrally formed with the lower core layer 31. Additionally, inclined regions may be formed on both sides of the magnetic pole region 31c in which the thickness of the lower core layer 31 gradually decreases from the sides of the magnetic pole region 31c.

Figure 16:
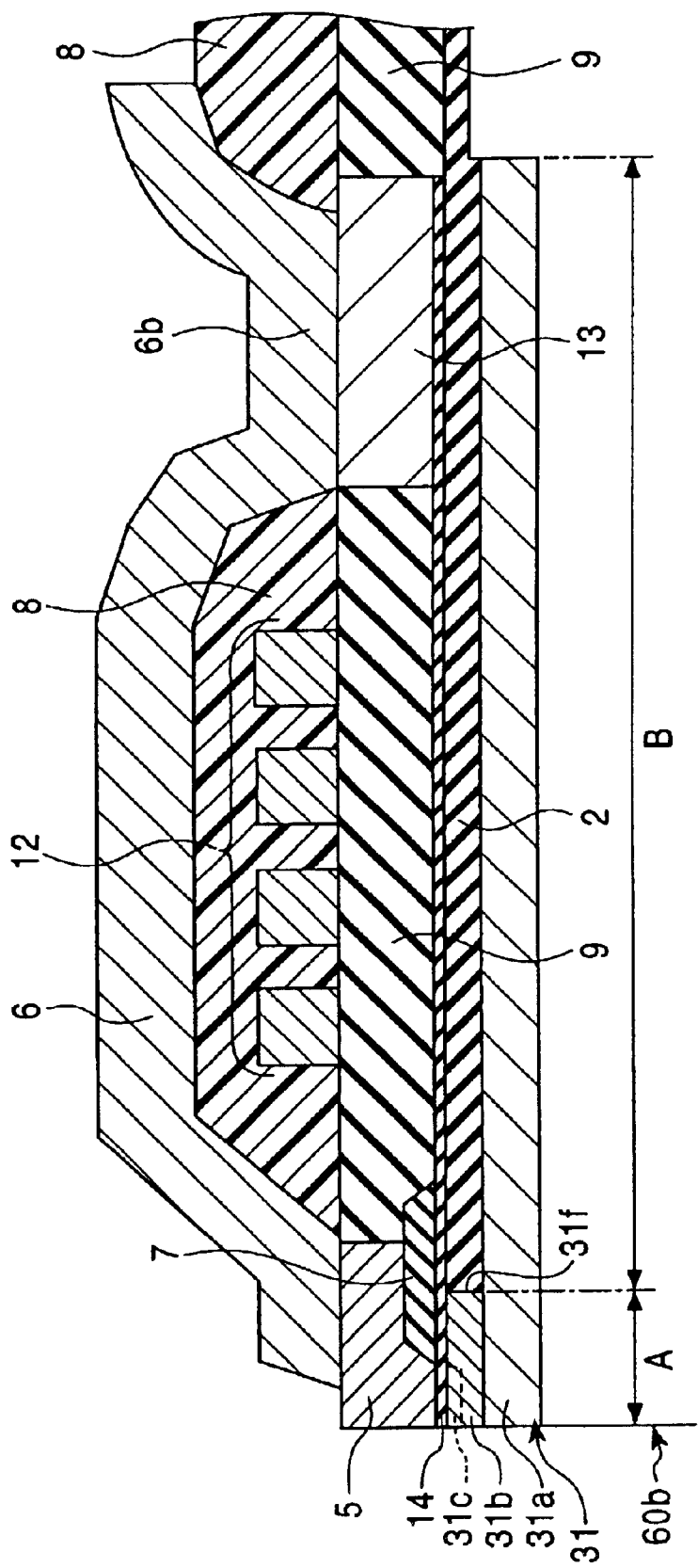
FIG. 16 illustrates a partial sectional view of a thin-film magnetic head in accordance with a third embodiment of the present invention.
Figure 17:
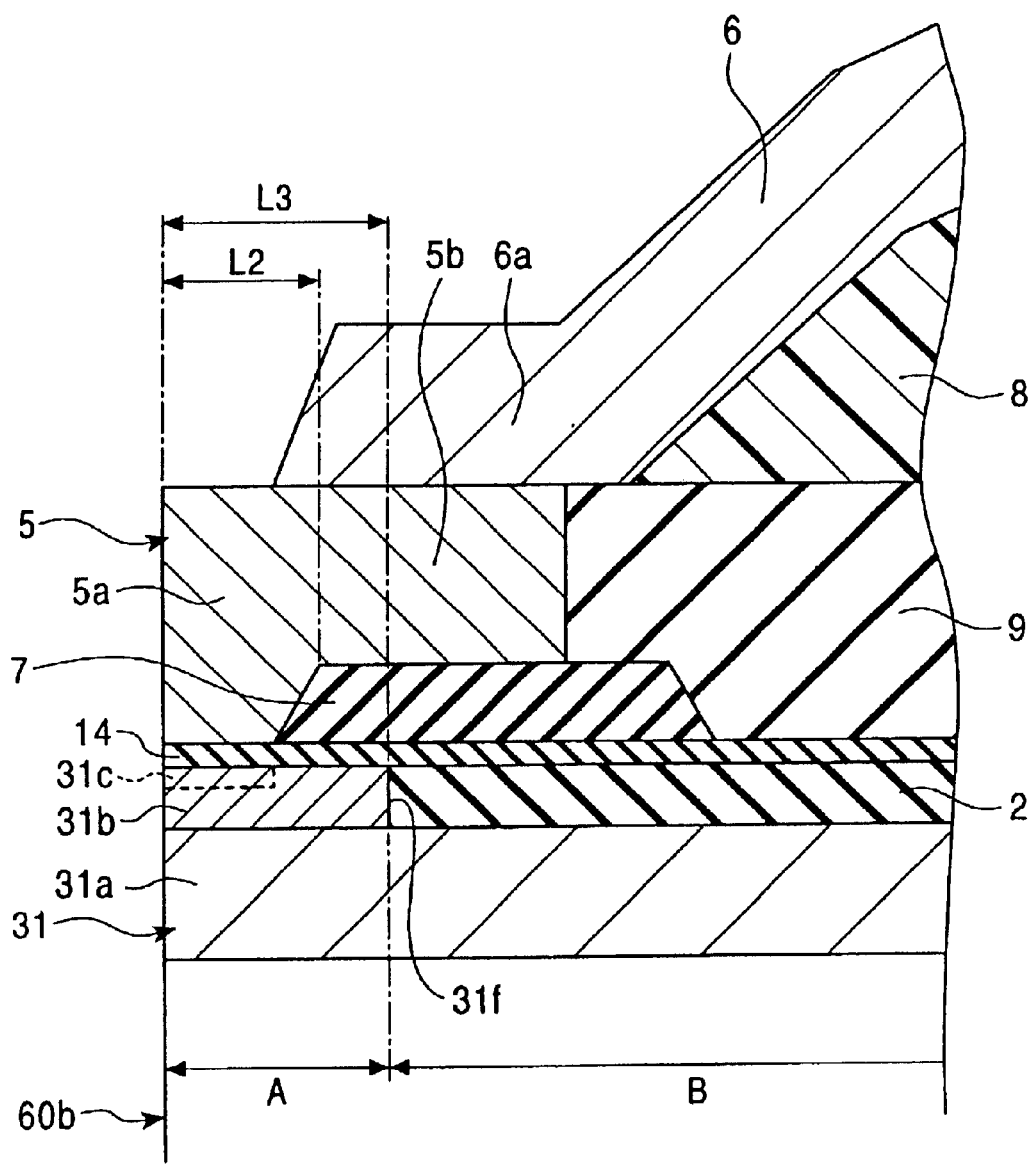
FIG. 17 illustrates a partial sectional view of the thin-film magnetic head of the third embodiment of the present invention.

As shown in FIG. 16, a planarizing nonmagnetic layer 2 composed of, for example, $Al_2O_3$ or $SiO_2$ is formed on the second region B of the lower core layer 31 in a manner similar to that in the first embodiment. A gap layer 14 composed of, for example, $Al_2O_3$ or $SiO_2$ is formed on the lower core layer 31 and over substantially the entire upper surface of the nonmagnetic layer 2. A Gd-defining layer 7 is formed on the lower core layer 31 with the gap layer 14 therebetween.

The shape of the Gd-defining layer 7, an upper magnetic pole layer 5, an elevating layer 13, an insulating layer 9, a coil layer 12, a coil insulating layer 8, and an upper core layer 6 are similar to those in the first embodiment illustrated in FIGS. 2 and 3.

Figure 19:
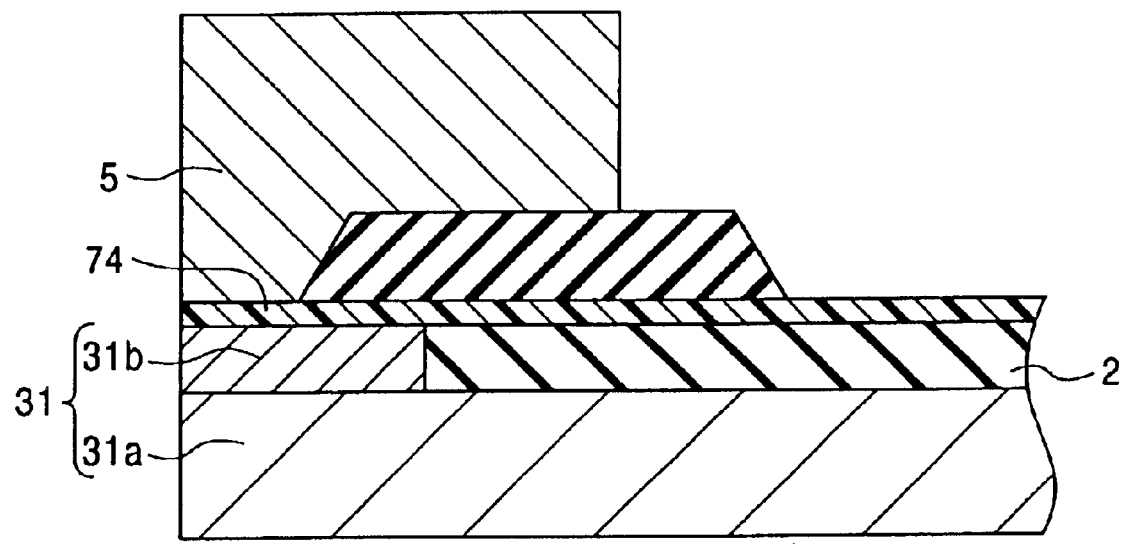
FIG. 19 illustrates a partial sectional view showing a processing step for fabricating a thin-film magnetic head of the third embodiment.

Next, a method for fabricating a thin-film magnetic head of the fourth embodiment will be described. In a manner similar to the first embodiment, a lower sublayer 31a and an upper sublayer 31b of a lower core layer 31 are formed by plating, and then a nonmagnetic layer 2 is formed. As illustrated in FIG. 19, after forming a nonmagnetic film 74, a Gd-defining layer 7 is formed in a manner similar to the first embodiment. After the Gd-defining layer 14 is formed, an upper magnetic pole layer 5 is formed by frame plating.

Figure 20:
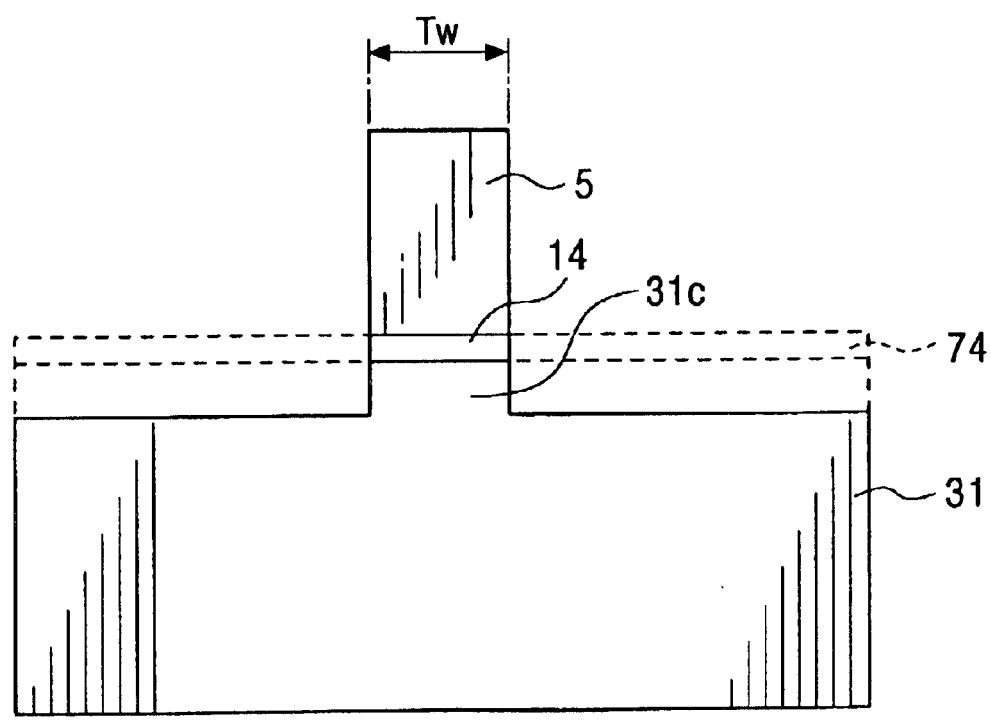
FIG. 20 illustrates a partial front view showing a processing step for fabricating the thin-film magnetic head of the third embodiment.

In the ion milling step illustrated in FIG. 20, by performing ion irradiation on the lower core layer 31, the nonmagnetic film 74, the upper magnetic pole layer 5, and the lower core layer 31 on both sides of the upper magnetic pole layer 5 are trimmed off, while leaving the gap layer 14 and the lower core layer 31 covered with the upper magnetic pole layer 5. In this way, a magnetic pole region 31c is formed in the lower core layer 31.

An insulating layer 9, an elevating layer 13, a coil layer 12, a coil insulating layer 8, and an upper core layer 6 are formed in sequence, and the fabrication of the thin-film magnetic head is thereby completed.

The thin-film magnetic head H of the fourth embodiment is mounted on a magnetic recording apparatus, and writing is performed in a similar manner as that in the first embodiment.

Figure 21:
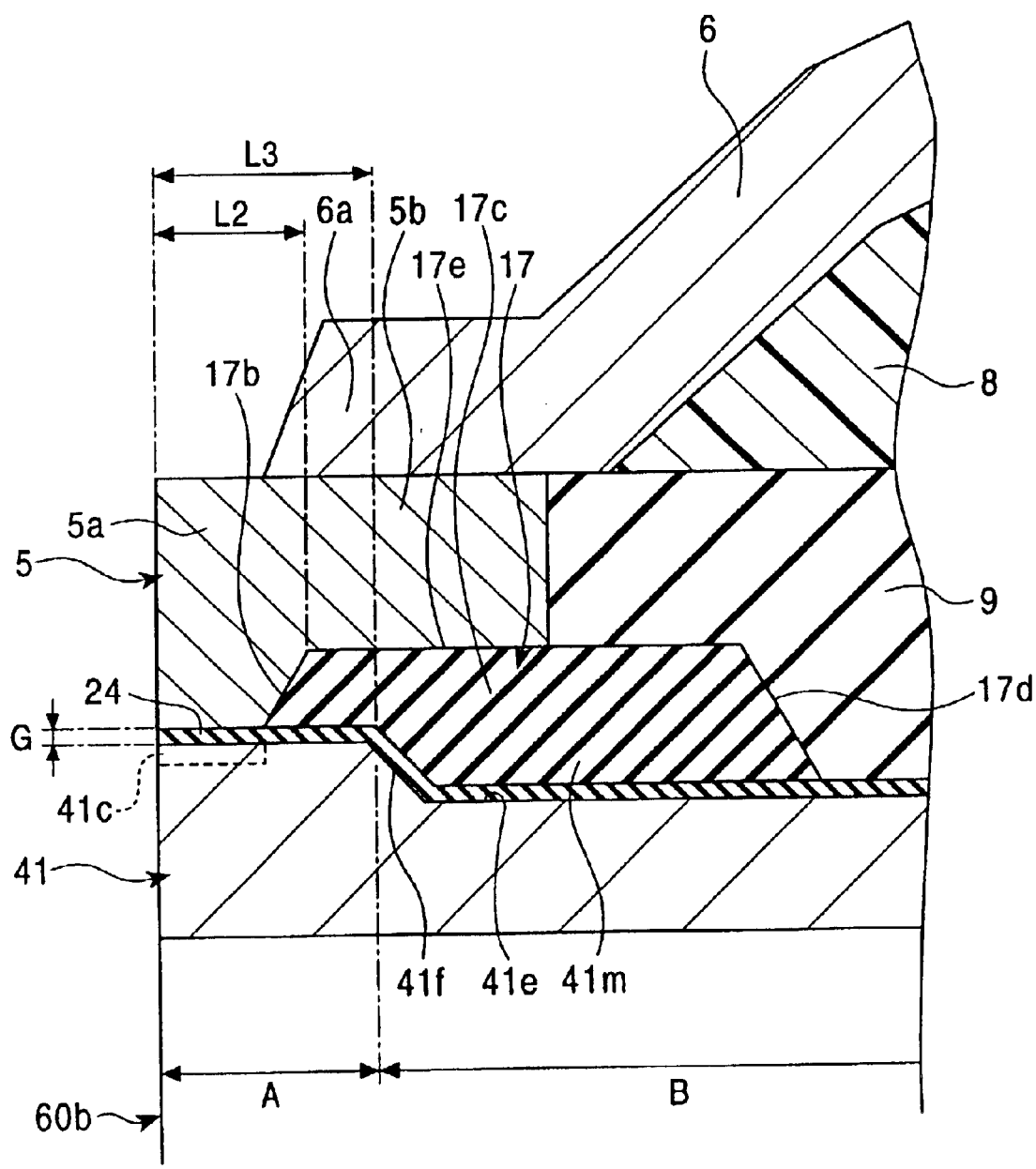
FIG. 21 illustrates a partial sectional view of a thin-film magnetic head of a fourth embodiment of the present invention.
Figure 22:
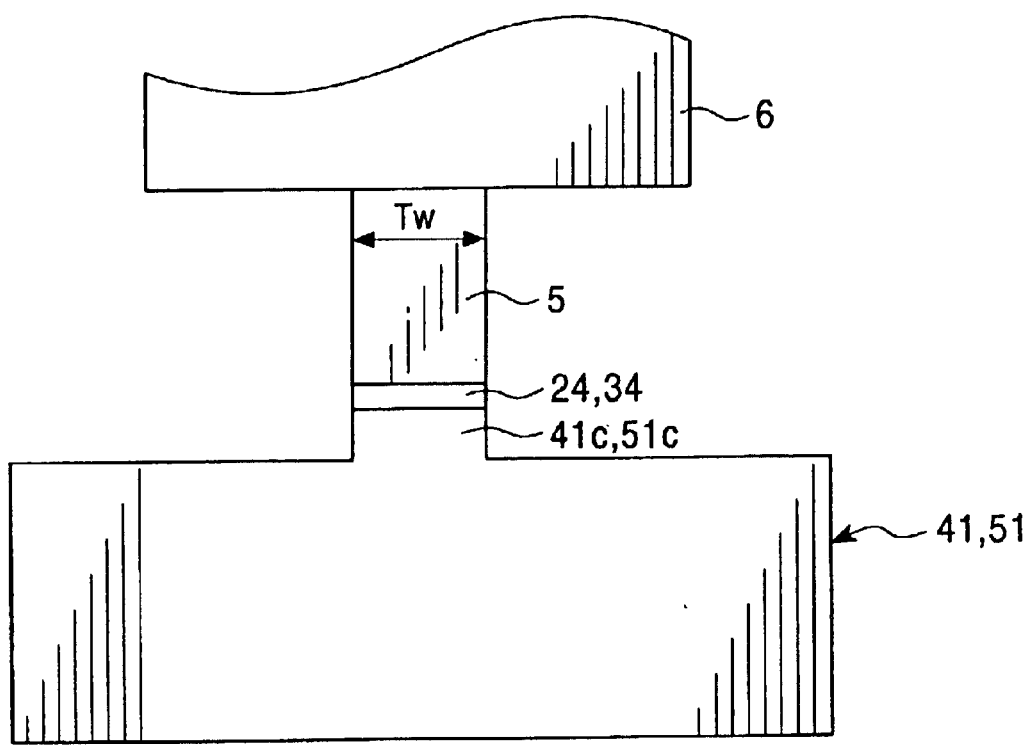
FIG. 22 illustrates a partial front view of the thin-film magnetic head of the fourth embodiment, viewed from the surface facing a recording medium.

FIG. 21 is a sectional view illustrating a portion of a thin-film magnetic head of a fifth embodiment of the present invention. A recess 41m is formed in a lower core layer 41, an upper surface 41e of the lower core layer 41 being recessed in a similar manner as that in the second embodiment. A magnetic pole region 41c is formed at the front end of the lower core layer 41, as illustrated in FIG. 22 and in a manner similar to the fourth embodiment.

A gap layer 24 composed of, for example, $Al_2O_3$ or $SiO_2$ is formed on the magnetic pole region 41c of the lower core layer 41 and over substantially the entire upper surface of the lower core layer 41.

Since a Gd-defining layer 17, an upper magnetic pole layer 5, an elevating layer 13, an insulating layer 9, a coil layer 12, a coil insulating layer 8, and an upper core layer 6 are similar to those in the second embodiment, the same reference numerals are used and the description thereof is omitted.

In a method for fabricating a thin-film magnetic head of the fifth embodiment, a recess 41m is formed by etching in a lower core layer 41 in a similar manner as that in the second embodiment, and a magnetic pole region 41c is formed in the front end of the lower core layer 41 in a manner similar to the fourth embodiment.

The thin-film magnetic head H of the fifth embodiment is mounted on a magnetic recording apparatus, and writing is performed in a similar manner as that in the second embodiment.

Figure 23:
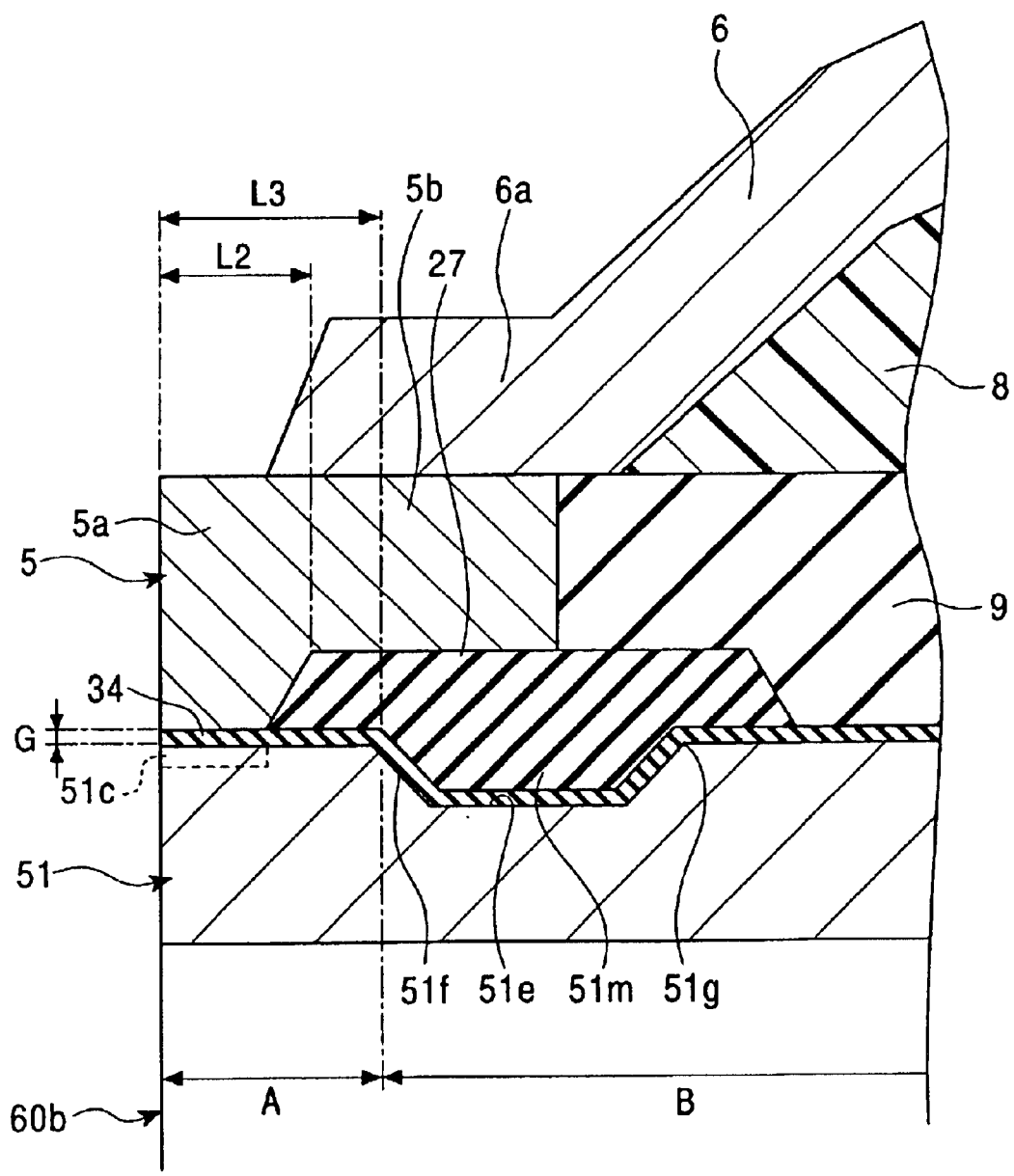
FIG. 23 illustrates a partial sectional view of a thin-film magnetic head in accordance with a fifth embodiment of the present invention.

In a sixth embodiment of the present invention illustrated in FIG. 23, a magnetic pole region 51c is provided on the front end of a lower core layer 51 in a similar manner as that in the fifth embodiment. A recess 51m is formed in the lower core layer 51 and an upper surface 51e is recessed. In similarity to the third embodiment, the recess 51m does not extend to the rear end of the lower core layer 51.

The lower core layer 51 has an inclined step 51f in the boundary between the first region A and the second region B and also has an inclined step 51g opposing the inclined step 51f in the second region B.

A gap layer 34 composed of, for example, $Al_2O_3$ or $SiO_2$ is formed on the magnetic pole region 51c of the lower core layer 51 and over substantially the entire surface of the lower core layer 51.

Since a Gd-defining layer 27, an upper magnetic pole layer 5, an elevating layer 13, an insulating layer 9, a coil layer 12, a coil insulating layer 8, and an upper core layer 6 are similar to those in the third embodiment, the same reference numerals are used, and the description thereof is omitted. Also, since the fabrication method of the sixth embodiment is similar to that of the fifth embodiment, the description is omitted.

The thin-film magnetic head H of the sixth embodiment is mounted on a magnetic recording apparatus, and writing is performed in a similar manner as that in the third embodiment.

In the fourth, fifth, and sixth embodiments, the magnetic pole regions 31c, 41c, and 51c protrude in the thickness direction of the lower core layers 31, 41, and 51, respectively. However, a flat lower core layer 31, 41, or 51 without a protruding magnetic pole region 31c, 41c, or 51c can also be used.

Figure 24:
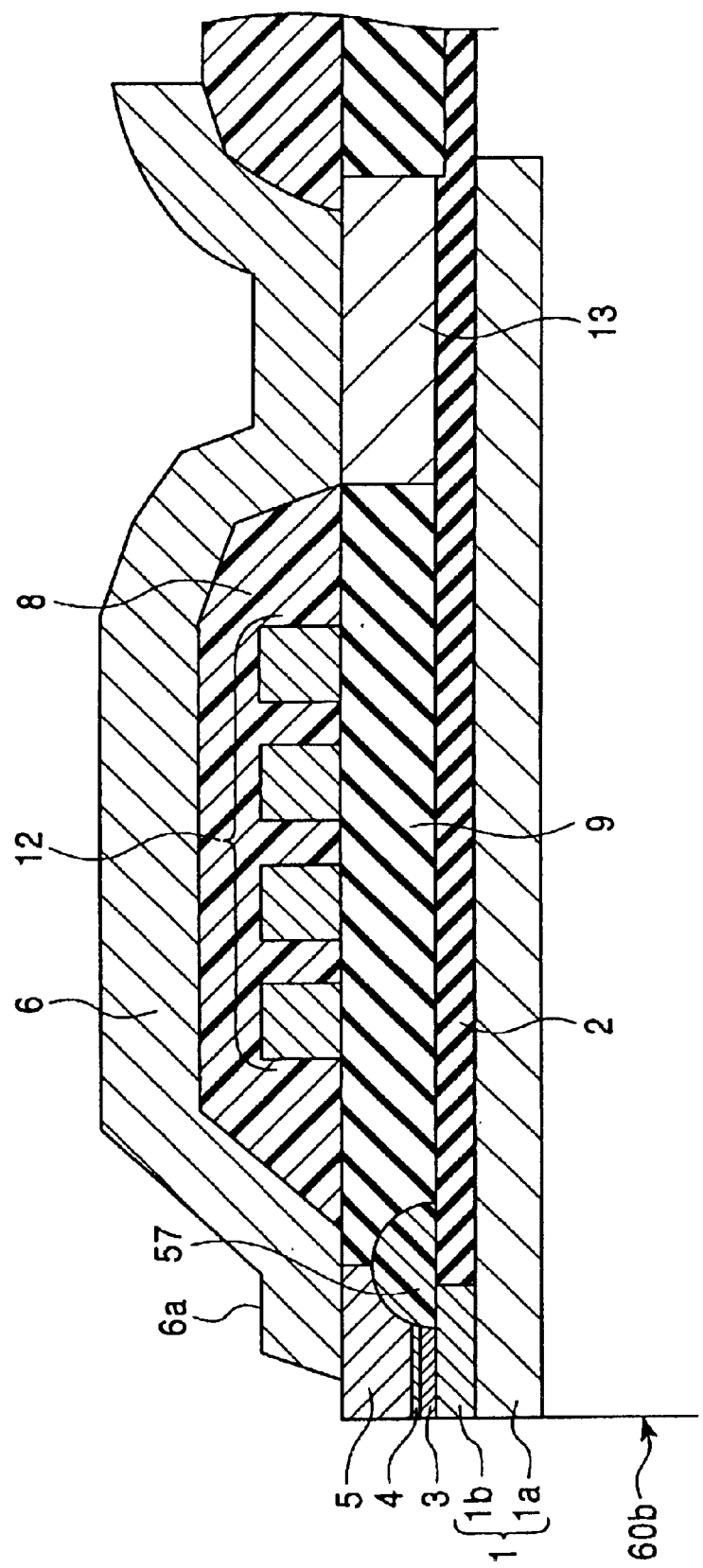
FIG. 24 illustrates a partial sectional view of a thin-film magnetic head in accordance with another embodiment of the present invention.

As long as the distance between the upper surface of the Gd-defining layer and the lower core layer is changed by a step of the lower core layer, the Gd-defining layer may have any shape. For example, as illustrated in FIG. 24, a Gd-defining layer 57 may have a curved upper surface.

Figure 25:
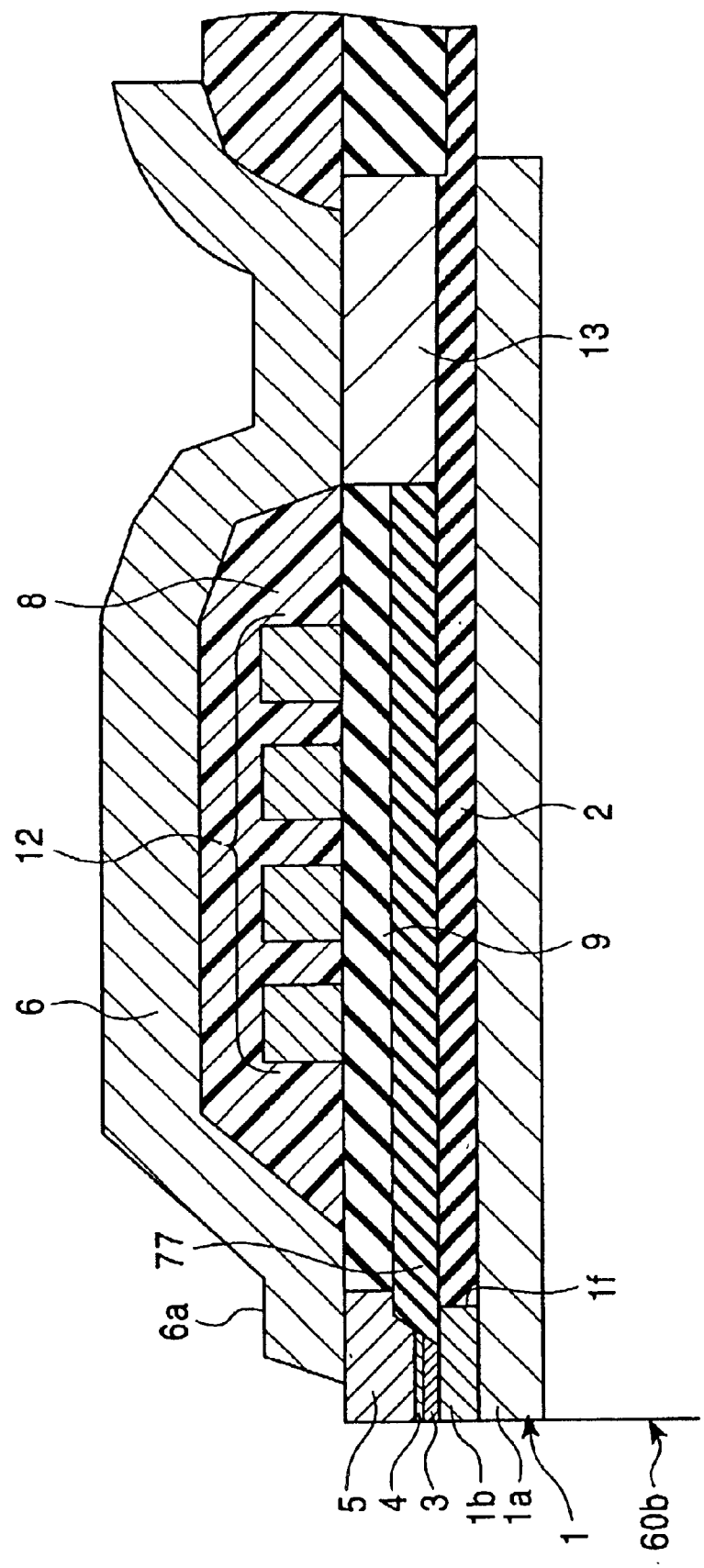
FIG. 25 illustrates a partial sectional view of a thin-film magnetic head in accordance with yet another embodiment of the present invention.

Additionally, as illustrated in FIG. 25, a Gd-defining layer 77 may be extended to an elevating layer 13 that magnetically couples a lower core layer 1 and an upper core layer 6 to each other.

Figure 26:
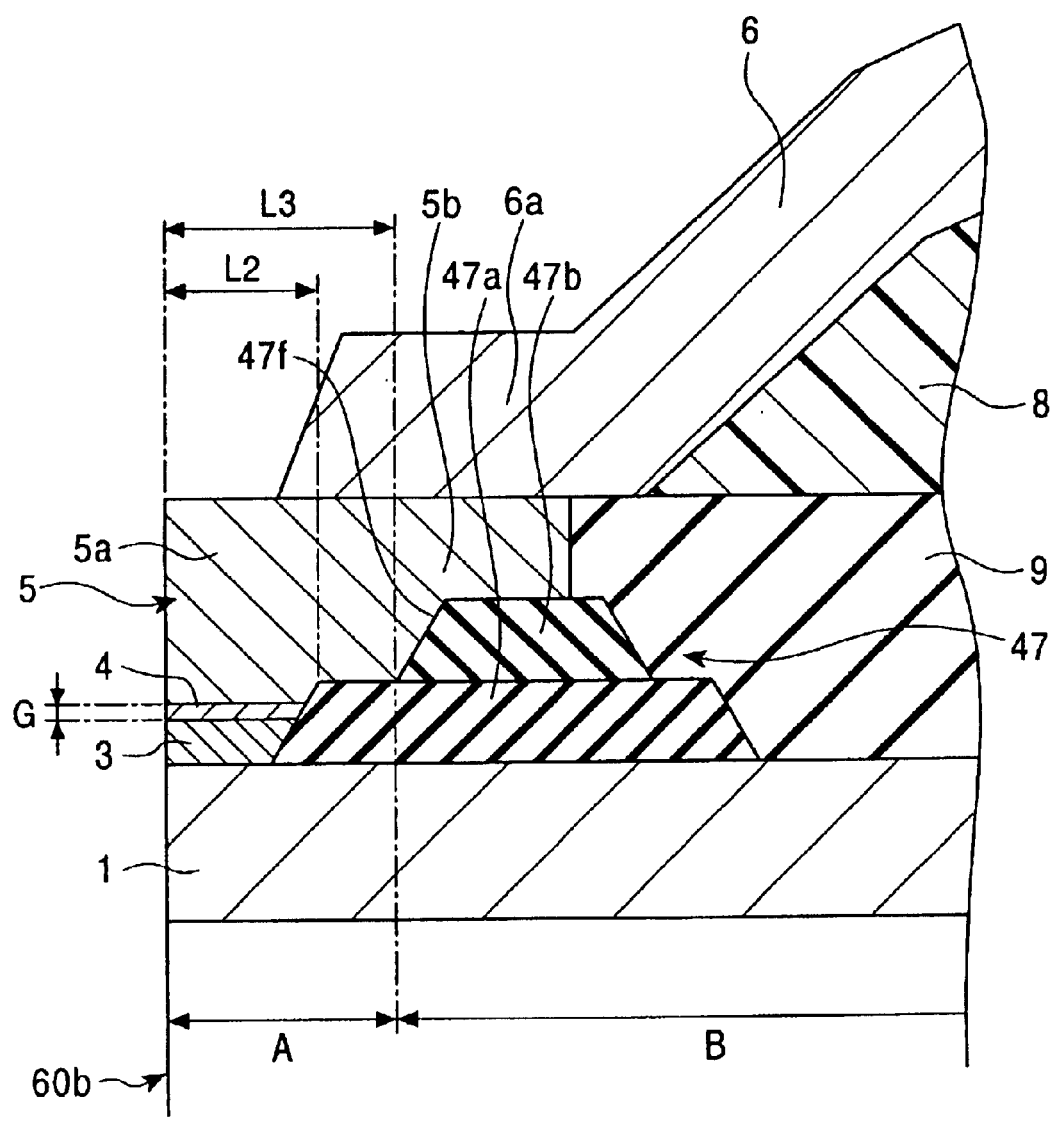
FIG. 26 illustrates a partial sectional view of the thin-film magnetic head illustrated in FIG. 25.
Figure 27:
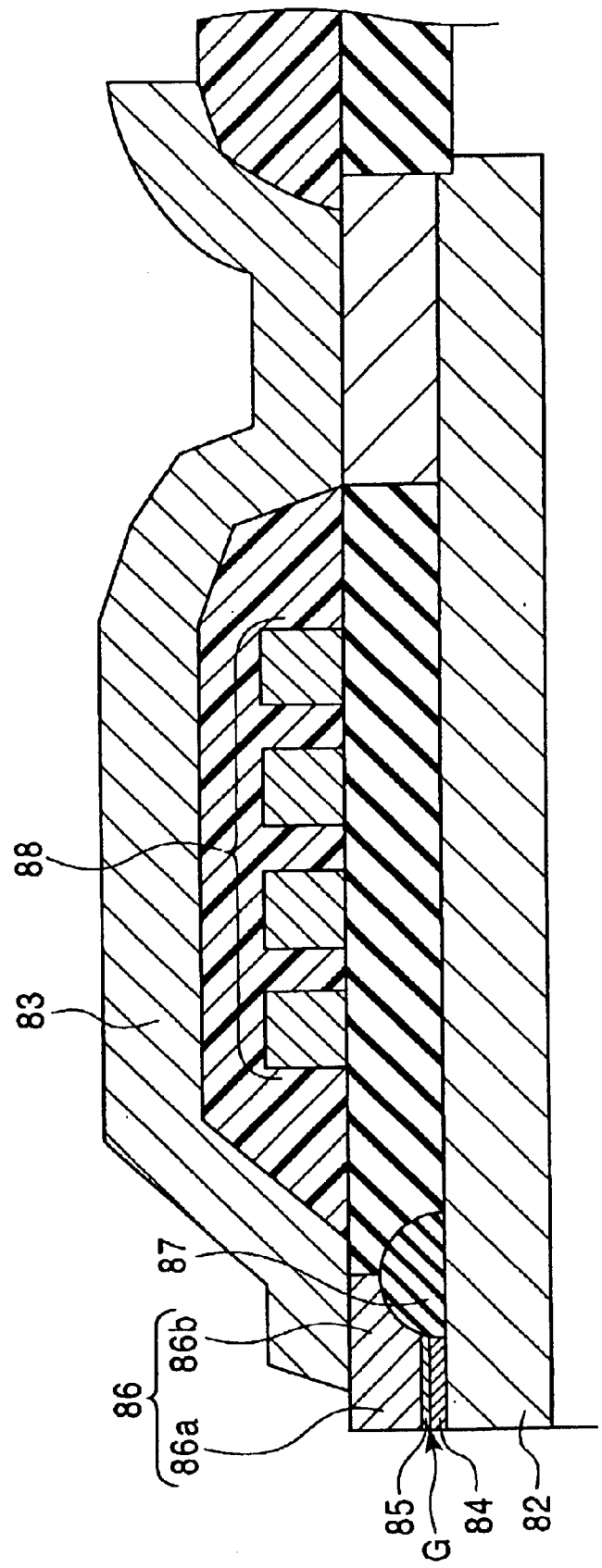
FIG. 27 illustrates a sectional view showing a key part of a conventional thin-film magnetic head.

In the embodiment, illustrated in FIG. 26, a Gd-defining layer 47 having a two-layered structure is formed on a flat upper surface of a lower core layer 1. The Gd-defining layer 47 includes a first Gd-defining sublayer 47a and a second Gd-defining sublayer 47b placed on the back of the first Gd-defining sublayer 47a. In this structure, a step 47f is formed in the boundary between the first Gd-defining sublayer 47a and the front end of the second Gd-defining sublayer 47b, and the thickness of the Gd-defining layer 47 in the second region B is larger than the thickness of the Gd-defining layer 47 in the first region A.

An upper magnetic pole layer 5 is in contact with the first Gd-defining sublayer 47a in the front region, and is in contact with the second Gd-defining sublayer 47b in the back region. Therefore, the distance between the lower core layer 1 and the upper magnetic pole layer 5 is small in the first region A and is large in the second region B.

Although the thin-film magnetic head H including an inductive head for writing only is described in each of the embodiments described above, the thin-film magnetic head H may include a read head employing a magnetoresistive element, and the like, and may be provided under the inductive head for writing.

In the thin-film magnetic head of the present invention, the distance between the upper surface of the Gd-defining layer and the lower core layer is changed stepwise and the distance is small in the front region of the lower core layer. Therefore, if the distance between the upper magnetic pole layer and the lower core layer is decreased by decreasing the thickness of the Gd-defining layer sandwiched between the upper magnetic pole layer and the lower core layer, the leakage magnetic field from the upper magnetic pole layer is easily absorbed by the lower core layer and is not substantially applied to a recording medium, and thus side fringing can be suppressed.

What is claimed is:

1. A thin-film magnetic head comprising:
   a lower core layer comprising an upper surface and a bottom surface and a first region with a predetermined thickness extending from a front end to a back end of the lower core layer and a second region behind the first region, the upper surface of the second region being lower relative to the bottom surface than the upper surface of the first region;
   a nonmagnetic gap layer overlying a portion of the first region of the lower core layer, with a lower magnetic pole layer therebetween;
   an upper magnetic pole layer having an upper surface and a back region and overlying the nonmagnetic gap layer;
   an upper core layer in contact with the upper surface of the upper magnetic pole layer, the upper core layer extending toward the back end of the lower core layer;
   a coil layer for inducing a recording magnetic field in the lower core layer and the upper core layer; and
   a nonmagnetic layer having an upper surface and extending from a position set back from the front end of the lower core layer over the first region and the second region of the lower core layer,
   wherein a contact interface between the nonmagnetic gap layer and the upper magnetic pole layer extends from the front end of the lower core layer to the nonmagnetic layer parallel to the upper surface of the first region, and a gap depth is defined within the length of the contact interface,
   wherein the back region of the upper magnetic pole layer extends on the upper surface of the nonmagnetic layer, and the nonmagnetic layer is located between the back region of the upper magnetic pole layer and the lower core layer,
   wherein the second region of the lower core layer and the upper magnetic pole layer are separated by a first distance and the first region of the lower core layer and the upper magnetic pole layer are separated by a second distance, and wherein the first distance is larger than the second distance.

2. A thin-film magnetic head according to claim 1, wherein the nonmagnetic gap layer comprises a plated nonmagnetic metal.

3. A thin-film magnetic head according to claim 1, wherein the lower core layer comprises a lower sublayer having a predetermined thickness and an upper sublayer having a predetermined thickness partially disposed on the lower sublayer, wherein a region in which the upper sublayer is disposed on the lower sublayer corresponds to the first region, and a region in which the upper sublayer is not disposed on the lower sublayer corresponds to the second region.

4. A thin-film magnetic head according to claim 1, wherein a thickness of the lower core layer is reduced beginning at a position set back from the front.

5. A thin-film magnetic head according to claim 1, wherein the nonmagnetic layer comprises a planarizing nonmagnetic layer that is formed on the second region of the lower core layer and having an upper surface that is flush with the upper surface of the first region of the lower core layer, and a Gd-defining layer that extends over the upper surface of the first region of the lower core layer and a portion of the upper surface of the planarizing nonmagnetic layer.

6. A thin-film magnetic head according to claim 5, wherein the nonmagnetic gap layer extends on the upper surface of the first region of the lower core layer and the planarizing nonmagnetic layer, and the Gd-defining layer extends from a position set back from the front end of the lower core layer and overlies the gap layer.

7. A thin-film magnetic head according to claim 5, wherein the nonmagnetic gap layer extends from the front end of the lower core layer to a front face of the Gd-defining layer.

8. A thin-film magnetic head according to claim 5, wherein an upper surface of the Gd-defining layer comprises a flat surface portion that is substantially parallel to the upper surface of the first region of the lower core layer and located above the first region and the second region of the lower core layer, and wherein the back region of the upper magnetic pole layer extends on the flat surface.

9. A thin-film magnetic head according to claim 5, wherein the planarizing nonmagnetic layer comprises an inorganic insulating material.

10. A thin-film magnetic head according to claim 5, wherein the Gd-defining layer comprises an organic insulating material.

11. A thin-film magnetic head according to claim 1, wherein the nonmagnetic layer comprises a Gd-defining layer extending on the first region and the second region of the lower core layer, and wherein the thickness of the Gd-defining layer on the second region is larger than the thickness of the Gd-defining layer on the first region.

12. A thin-film magnetic head according to claim 11, wherein the nonmagnetic gap layer extends from the front end of the lower core layer to the front face of the Gd-defining layer.

13. A thin-film magnetic head according to claim 11, wherein an upper surface of the Gd-defining layer comprises a flat surface portion that is substantially parallel to the upper surface of the first region of the lower core layer and located above the first region and the second region of the lower core layer, and wherein the back region of the upper magnetic pole layer extends on the flat surface.

14. A thin-film magnetic head according to claim 11, wherein the Gd-defining layer comprises an inorganic insulating material.

15. A thin-film magnetic head according to claim 11, wherein the Gd-defining layer comprises an organic insulating material.

16. A thin-film magnetic head according to claim 1, wherein the upper magnetic pole layer comprises a pole region with a predetermined width at the front end of the lower core layer and a back region behind the pole region, the width of the back region gradually increasing from the pole region toward the back region, and wherein a base of the pole region is located above the first region of the lower core layer and overlying the nonmagnetic layer.

17. A thin-film magnetic head comprising:

a lower core layer having a front end and an upper surface;

a nonmagnetic gap layer extending on the front end of the lower core layer, with a lower magnetic pole layer therebetween;

an upper magnetic pole layer extending on the gap layer;

an upper core layer in contact with an upper surface of the upper magnetic pole layer;

a coil layer for inducing a recording magnetic field to the lower core layer and the upper core layer; and a nonmagnetic layer extending from a position set back from the front end and overlying the lower core layer, wherein a contact interface between the gap layer and the upper magnetic pole layer extends from the front end to the nonmagnetic layer substantially parallel to the upper surface of the lower core layer, and a gap depth is defined within the length of the contact interface, wherein the nonmagnetic layer comprises a front region in proximity to the front end of the lower core layer and a back region disposed behind the front region with a step therebetween, the back region having an upper surface and having a larger thickness than that of the front region, and wherein the upper magnetic pole layer extends on the upper surface of the back region of the nonmagnetic layer, wherein the lower core layer and the upper magnetic pole layer are separated by a first distance in the front region of the nonmagnetic layer, wherein the lower core layer and the upper magnetic pole layer are separated by a second distance in the back region of the nonmagnetic layer, and wherein the first distance is less than the second distance.

* * * * *